(12) United States Patent
Yamagata et al.

(10) Patent No.: US 10,029,296 B2
(45) Date of Patent: Jul. 24, 2018

(54) FORMING DIE, AND UNDERCUT FORMING METHOD

(71) Applicant: NIPPON STEEL & SUMITOMO METAL CORPORATION, Tokyo (JP)

(72) Inventors: Mitsuharu Yamagata, Kitakyushu (JP); Shuji Yamamoto, Kitakyushu (JP); Takeshi Kawachi, Kisarazu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 79 days.

(21) Appl. No.: 15/309,345

(22) PCT Filed: Apr. 20, 2015

(86) PCT No.: PCT/JP2015/061971
§ 371 (c)(1),
(2) Date: Nov. 7, 2016

(87) PCT Pub. No.: WO2015/170574
PCT Pub. Date: Nov. 12, 2015

(65) Prior Publication Data
US 2017/0106431 A1    Apr. 20, 2017

(30) Foreign Application Priority Data
May 9, 2014    (JP) .................................. 2014-097796

(51) Int. Cl.
*B21J 13/02*    (2006.01)
*B21J 5/02*    (2006.01)

(52) U.S. Cl.
CPC ............. *B21J 13/025* (2013.01); *B21J 5/025* (2013.01)

(58) Field of Classification Search
CPC ..... B21J 5/02; B21J 5/025; B21J 13/02; B21J 13/025
See application file for complete search history.

(56) References Cited

U.S. PATENT DOCUMENTS

| 2013/0008275 | A1 | 1/2013 | Watanabe et al. |
| 2014/0020442 | A1* | 1/2014 | Menendez-Castanedo ................. B21J 5/12 72/362 |

FOREIGN PATENT DOCUMENTS

| DE | 19832503 A1 | 1/2000 |
| JP | 63-224833 A | 9/1988 |

(Continued)

OTHER PUBLICATIONS

Japanese Office Action, dated Oct. 17, 2017, for counterpart Japanese Application No. 2016-517856, including a partial English translation.

(Continued)

*Primary Examiner* — Teresa M Ekiert
(74) *Attorney, Agent, or Firm* — Birch, Stewart, Kolasch & Birch, LLP

(57) ABSTRACT

A forming die includes: a lower forming die having a bottom part and a side wall part; an upper forming die that is movable toward the bottom part of the lower forming die along an axis parallel to the side wall part of the lower forming die; and a push-in die that is movable toward the bottom part of the lower forming die along the axis between the side wall part of the lower forming die and the upper forming die.

19 Claims, 22 Drawing Sheets

(56) References Cited

FOREIGN PATENT DOCUMENTS

| JP | 5-57760 A | 3/1993 |
| JP | 8-57561 A | 3/1996 |
| JP | 2012-161839 A | 8/2012 |
| JP | 2013-237212 A | 11/2013 |

OTHER PUBLICATIONS

International Search Report for PCT/JP2015/061971 dated Jul. 7, 2015.
Written Opinion of the International Searching Authority for PCT/JP2015/061971 (PCT/ISA/237) dated Jul. 7, 2015.

\* cited by examiner

FORMING DIE, AND UNDERCUT FORMING METHOD

TECHNICAL FIELD OF THE INVENTION

The present invention relates to a forming die, and an undercut forming method.

Priority is claimed on Japanese Patent Application No. 2014-097796 filed on May 9, 2014, the contents of which are incorporated herein by reference.

RELATED ART

As methods of forming a product having an undercut part, a method of forming an undercut part through cutting in a post-process, and a method using a forming die having a collapsible core or a sliding core as are known. The collapsible core is constituted of a plurality of cores disposed in a circumferential direction, and a center pin disposed at the center of the plurality of cores. In the collapsible core, the diameter of the respective cores is increased by pushing in the center pin, and the diameter of the respective cores is reduced by pulling out the center pin.

Additionally, forming dies having a sliding core are disclosed in Patent Document 1 and Patent Document 2. In the forming die of Patent Document 1, by alternately providing sliding surfaces with a small inclination angle and a large inclination angle at a center core, alternately disposing split cores having angles corresponding to the respective sliding surfaces around the center core, and making the split cores slide via inverted trapezoidal grooves provided in the respective sliding surfaces, the diameters of undercut forming parts of the split cores are reduced.

In the forming die of Patent Document 2, after first split cores and second split cores are alternately disposed at an outer periphery of a center core, and the diameter of the first split cores is reduced toward a central axis of the center core, the second split cores are moved in a direction that intersects an extraction direction and a diameter-decreasing direction of the first split cores.

CITATION LIST

Patent Documents

[Patent Document 1] Japanese Unexamined Patent Application, First Publication No. H5-57760
[Patent Document 2] Japanese Unexamined Patent Application, First Publication No. 2013-237212

DISCLOSURE OF THE INVENTION

Problems to be Solved by the Invention

However, in the method of forming an undercut part through cutting, cost is increased due to an increase in the number of processes. Additionally, in the method using the collapsible core, a driving mechanism of the collapsible core is complicated, and substantial time is required for assembly and adjustment. Therefore, cost reduction is difficult.

Additionally, in Patent Document 1, machining of the inverted trapezoidal grooves having negative angles, and engaging projection parts that make a pair with these grooves and that are provided in the split cores, is difficult, and die cost becomes high. Additionally, in Patent Document 2, additional components, such as support members and holders for driving the split cores, are required, the number of components of the die increases, and die cost becomes high.

The invention has been made in view of the above circumstances, and an object thereof is to provide a forming die and an undercut forming method that can form a formed product having an undercut part at low cost.

Means for Solving the Problem

In order to solve the above problems, the invention has adopted the following.

(1) A forming die related to a first aspect of the invention includes a lower forming die having a bottom part and a side wall part; an upper forming die that is movable toward the bottom part of the lower forming die along an axis parallel to the side wall part of the lower forming die; and a push-in die that is movable toward the bottom part of the lower forming die along the axis between the side wall part of the lower forming die and the upper forming die. The upper forming die includes a die body that is provided to be movable toward the bottom part of the lower forming die along the axis, in a state where a central axis coincides with the axis, a first split core that abuts against a bottom surface of the die body and is provided to be movable in a direction that extends radially with the axis as a center, a movable shaft member that is provided to be non-detachable downward from the bottom surface of the die body and be insertable into an inside of the die body from the bottom surface of the die body along the axis, in a state where a central axis coincides with the axis, a second split core that is provided to be movable in a direction that extends radially from a lower end of the movable shaft member with the axis as a center. The first and second split cores alternately disposed around the axis. The first and second split cores respectively have forming surfaces that separate from the die body, as the first and second split cores move apart from the axis in the extending direction. The first and second split cores are present inside an outer edge of the die body and the second split core is disposed below the first split core, in a state where the movable shaft member is exposed most from the die body. The second split core approaches the bottom surface of the die body while sliding on the first split core, in a process in which the movable shaft member is inserted into the inside of the die body, and thereby, the first and second split cores respectively move to positions where the forming surfaces of the first and second split cores protrude outside of the outer edge of the die body.

(2) The aspect described in the above (1) may be configured as follows. The first split core further includes a pair of first inclined surfaces that are joined together so as to narrow with an upper surface of the first split core as a center while sandwiching the upper surface of the first split core therebetween. The second split core further includes a second inclined surface that is a surface mating with the first split core and comes into contact with the first inclined surfaces of the first split core. Portions of the first inclined surfaces of the first split core overlap the second inclined surface of the second split core, in a state where the movable shaft member is exposed most from the die body. In a process in which the movable shaft member is inserted into the inside of the die body, the first split core and the second split core move while the first inclined surfaces of the first split core and the second inclined surface of the second split core slide on each other until the first inclined surfaces of the first split core and the second inclined surface of the second split core are mated with each other.

(3) The aspect described in the above (1) or (2) may be configured as follows. The die body includes a first guide part that has a columnar shape and extends toward a radial outer side. The movable shaft member includes a second guide part that has a columnar shape and extends toward the radial outer side. The first split core further includes a first housing part that slides along the extending direction of the first guide part with respect to the first guide part and houses the first guide part. The second split core further includes a second housing part that slides along the extending direction of the second guide part with respect to the second guide part and houses the second guide part.

(4) In the aspect described in the above (3), the hardness of the first guide part may be lower than the hardness of the first split core, and the hardness of the second guide part may be lower than the hardness of the second split core.

(5) The aspect described in any one of the above (1) to (4) may be configured as follows. The first split core further includes a protrusion that is provided on an upper surface of the first split core. The second split core further includes a protrusion that is provided on an upper surface of the second split core. The die body further includes an abutting surface that abuts against the protrusion of the first split core and the protrusion of the second split core.

(6) An undercut forming method related to another aspect of the invention is a method of forming an undercut part in a stock having an opening, using the forming die according to any one of above (1) to (5). The method includes a first process in which the stock is placed on the lower forming die along the bottom part and the side wall part; a second process in which the second split core is made to approach the bottom surface of the die body while being made to slide on the first split core at a predetermined position within the opening of the stock, and the forming surfaces of the first and second split cores are made to protrude outside of the outer edge of the die body; a third process in which the push-in die is moved toward the bottom part of the lower forming die while being made to abut against the stock and a portion of an inside surface of the stock and is made to abut against the forming surfaces of the first and second split cores; and a fourth process in which the upper forming die is moved in a direction away from the bottom part of the lower forming die.

(7) In the above aspect (6), in the first process, the outside surface of the stock may be made to abut against the side wall part of the lower forming die, and in the third process, the push-in die may be moved toward the bottom part of the lower forming die while being made to abut against an upper end surface of the stock.

Effects of the Invention

According to the above respective aspects of the invention, a formed product having an undercut part can be formed by the forming die with a simple structure. Consequently, a formed product having an undercut part can be formed at low cost.

EMBODIMENTS OF THE INVENTION

Figure 1A:
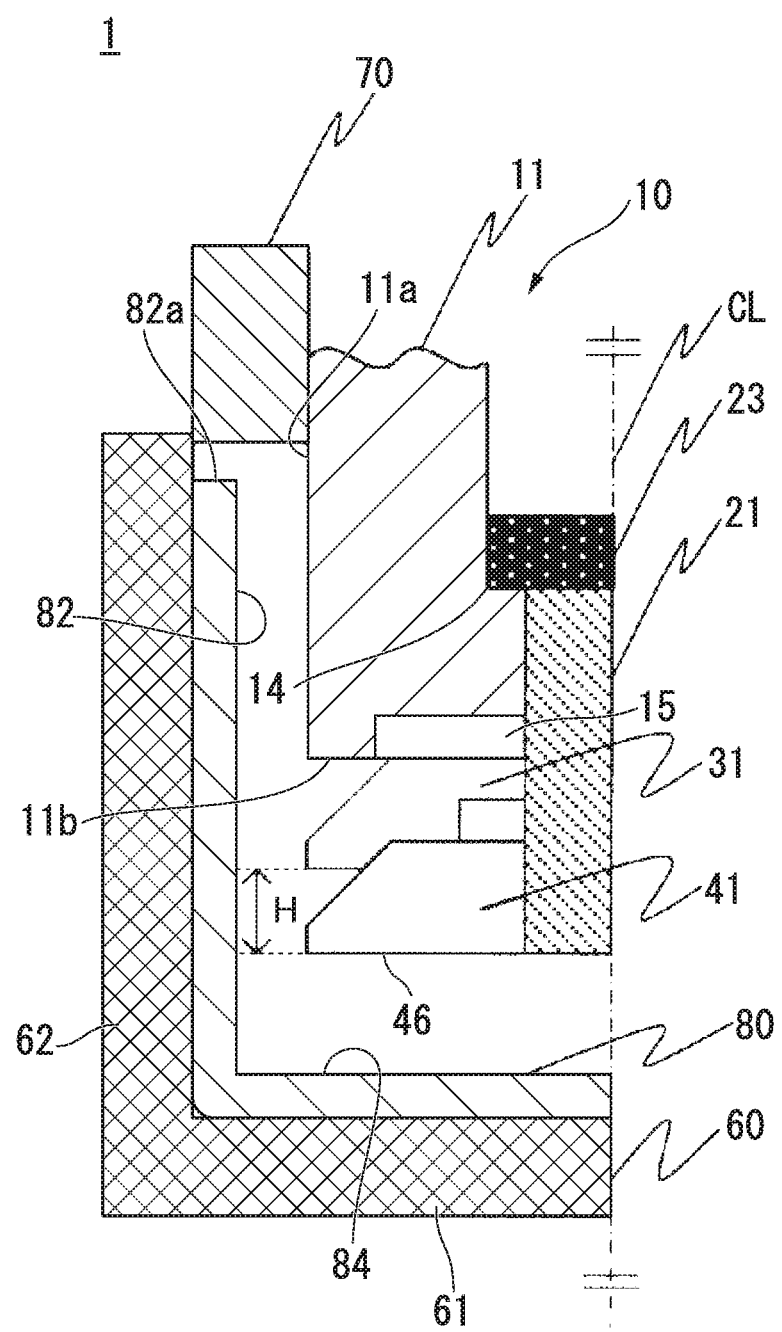
FIG. 1A is a view showing a forming die related to a first embodiment of the invention, and is a longitudinal sectional view showing a half on the left of an axis of the forming die in a section including the axis.

Hereinafter, respective embodiments of the invention will be described in detail, referring to the drawings. In addition, in the present specification and drawings, constituent elements having substantially the same functional configurations will be designated by the same reference signs, and thereby duplicate description thereof will be omitted.

First Embodiment

First, a forming die 1 (undercut forming die) related to a first embodiment of the invention will be described. FIGS. 1A to 1E are longitudinal sectional views showing the forming die 1 related to the present embodiment, and are views for explaining a method of forming an undercut part 86 in a stock 80. As shown in FIGS. 1A to 1E, the forming die 1 is used when forming the undercut part 86 in the cup-shaped (bottomed cylindrical) stock 80 having a bottom wall part 84 and a vertical wall part 82 formed at an outer edge of the bottom wall part 84. Here, the undercut part 86 means a portion of an inner surface (inside surface) of the vertical wall part 82 of the stock 80 that swells toward a radial outer side of the stock 80, or a portion of the inner surface of the vertical wall part 82 of the stock 80 that protrudes toward the radial outer side of the stock 80.

In addition, the method of forming the undercut part 86 using the forming die 1 will be described below.

The material of the stock 80 is, for example, metal, such as iron, stainless steel, aluminum, titanium, magnesium, or alloy steel. In addition, the materials of the stock 80 are not limited to only those enumerated above, but the materials just have to be plastically deformable materials.

The forming die 1 related to the present embodiment, as shown in FIG. 1A, includes an upper forming die 10, a lower forming die 60, and a push-in die 70. In addition, the upper forming die 10, the lower forming die 60, and the push-in die 70 are installed in a pressing machine (not shown). Although the pressing machine may be an ordinary pressing machine, it is preferable that the pressing machine is a servo type pressing machine in which the bottom dead center position of the die on a driving side and the lowering speed of the die to a bottom dead center can be adjusted arbitrarily.

The lower forming die 60 has a bottom part 61 that abuts against and supports a bottom wall part 84 of the stock 80, and a side wall part 62 that abuts against and supports the vertical wall part 82 of the stock 80 from the periphery thereof. Then, when forming is performed, the stock 80 is placed within the lower forming die 60.

Figure 3:
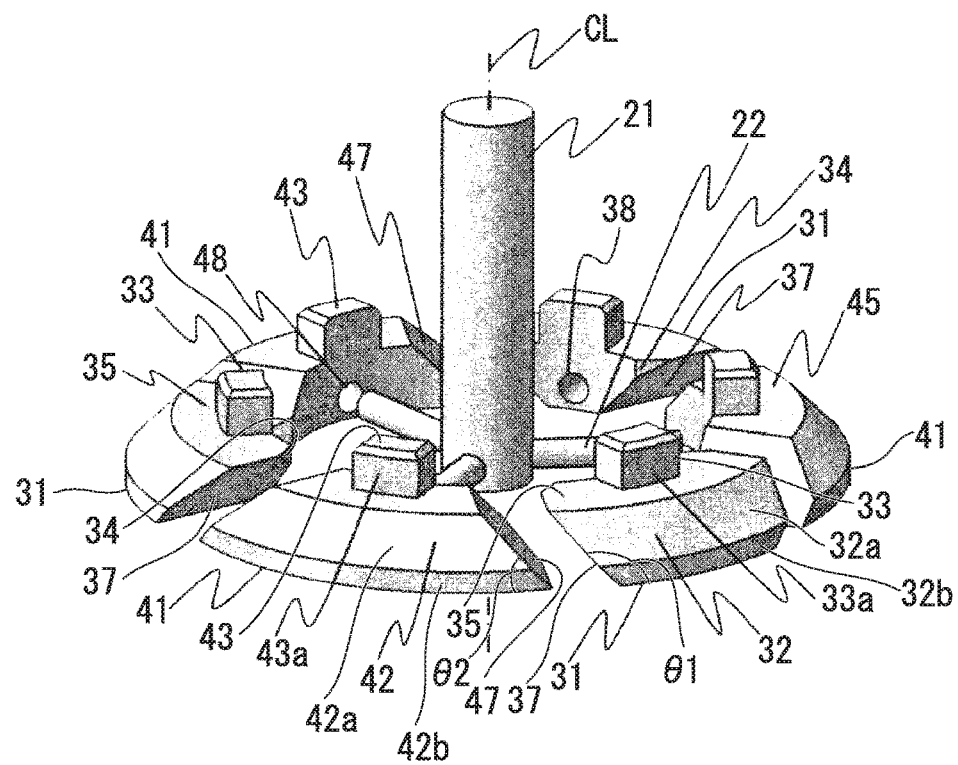
FIG. 3 is a perspective view showing a guide core, first split cores, and second split cores of the forming die.

As shown in FIGS. 1A and 3, the upper forming die 10 has a columnar center core 11 (die body), a columnar guide core 21 (movable shaft member) inserted into the center core 11 so as to become coaxial with a central axis CL of the center core 11, three first split cores 31, and three second split cores 41. The center core 11 is attached to a driving shaft of the pressing machine, and reciprocates linearly along the central axis CL. The upper forming die 10 is inserted into a recessed part formed by the vertical wall part 82 and the bottom wall part 84 of the stock 80 through an opening of the stock from above the stock 80.

In FIG. 1A, reference sign CL represents a movement axis of the upper forming die 10 that is the central axis and is parallel to the side wall part 62 of the lower forming die 60. In addition, the above movement axis CL coincides with the central axis of the center core 11 and a central axis of the guide core 21.

A stopper 23 is provided at an upper end of the guide core 21. The stopper 23 abuts against a stepped part 14 provided inside the center core 11, and prevents falling of the guide core 21 resulting from its own weight. That is, the guide core 21 is non-detachable downward from the center core 11 by the stopper 23.

The push-in die 70 is movable along the movement axis CL, and an presses an upper end surface 82a of the vertical wall part 82 of the stock 80 downward in a vertical direction.

Figure 2:
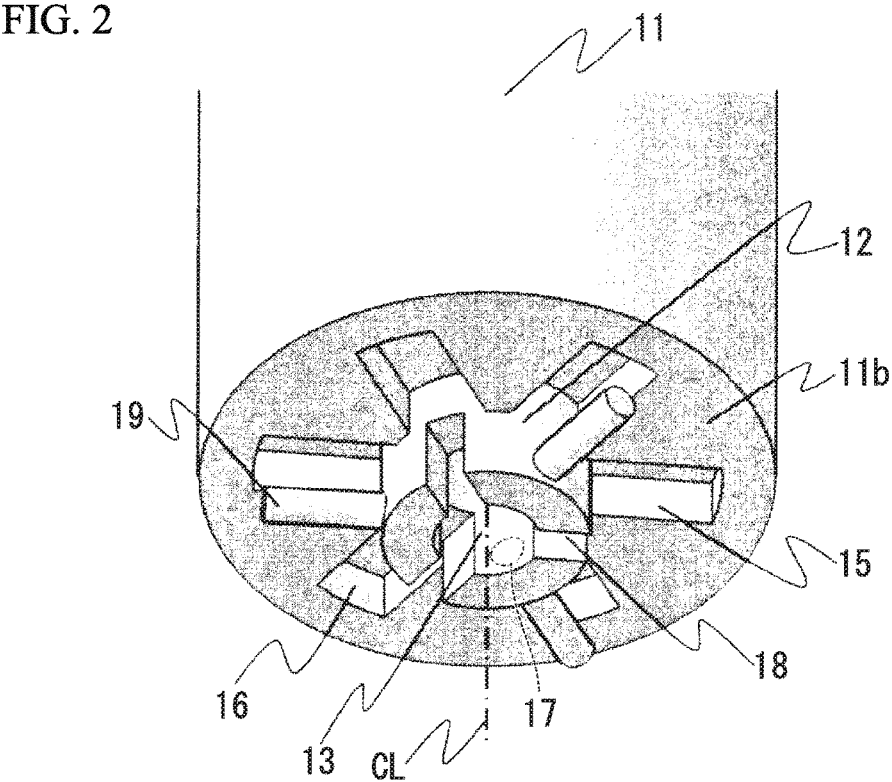
FIG. 2 is a perspective view showing a center core of the forming die.

FIG. 2 is a view showing the center core 11, and is a perspective view as seen from a bottom surface 11b side. As shown in FIG. 2, the center core 11 has bottom surface 11b (lower end surface) perpendicular to the central axis CL. The center of the bottom surface 11b of the center core 11 is provided with a cylindrical boss part 12 (cylindrical projection) that protrudes downward in the vertical direction of the center core 11 from the bottom surface 11b. A central axis of the boss part 12 coincides with the central axis CL of the center core 11. The boss part 12 is provided with a circular hole 13 that passes therethrough from a lower end surface of the boss part 12 along the central axis of the boss part 12 toward the inside of the center core 11. A central axis of the circular hole 13 also coincides with the central axis of the center core 11. The circular hole 13 is used as an attachment hole 13 (insertion hole) for attaching the guide core 21. Moreover, the bottom surface 11b of the center core 11 is provided with six groove parts 15 that extend from an outer peripheral surface of the boss part 12 toward a radial outer side of the center core 11 with the central axis as a center. The groove parts 15 are provided at intervals of 60° around the central axis. Also, an abutting surface 16 is provided at one end part (an end part located on a radial outer side of the center core 11) of each groove part 15.

The boss part 12 has three guide pins 19 (first guide part) that radially extend from an outer peripheral surface near a lower end of the boss part 12 toward the radial outer side of the boss part 12 with the central axis as a center. The guide pins 19 are provided at intervals of 120° around the central axis. In addition, three attachment holes 17 are provided at intervals of 120° around the central axis on the outer peripheral surface of the boss part 12, and the guide pins 19 (the first guide part) are each inserted into the attachment holes 17.

The shape of the guide pins 19 is not limited to a columnar shape, and, for example, a quadrangular prismatic shape, a triangular prismatic shape, or the like may be adopted. In addition, although will be described below, the first split cores 31 are attached to the guide pins 19.

The boss part 12 has three cutout parts 18 (recessed parts) that extend inward (upward) in a longitudinal direction of the boss part 12 from the lower end surface of the boss part 12. The cutout parts 18 are provided in three places (more specifically, positions that deviate by 60° around the central axis from the guide pins 19) at intervals of 120° around the central axis of the boss part 12.

In addition, when seen to face the bottom surface 11b of the center core 11, regions where the cutout parts 18 and the groove parts 15 are continuously present in a radial direction of the center core 11, and regions where the guide pins 19 and the groove parts 15 are present in an overlapping manner in the radial direction of the center core 11, are alternately present at intervals of 60° around the central axis.

FIG. 3 is a perspective view showing the guide core 21, the three first split cores 31, and the three second split cores 41. As shown in FIG. 3, the three first split cores 31 and the three second split cores 41 are alternately disposed around the central axis so as to surround the guide core 21.

Additionally, the guide core 21 has three guide pins 22 (second guide part) that radially extend from an outer peripheral surface near a lower end of the guide core 21 toward the radial outer side of the guide core 21 with the central axis as a center. The guide pins 22 are provided at intervals of 120° around the central axis.

Each first split core 31 is provided so as to face the bottom surface 11b of the center core 11, and has an upper surface 35 that abuts against the bottom surface 11b of the center core 11, a pair of inclined surfaces 37 (first inclined surfaces) that are inclined with respect to the central axis, a forming part 32 that abuts against an inner surface of the vertical wall part 82 of the stock 80, and a protrusion 33 that is provided on the upper surface 35. The pair of inclined surfaces 37 is both end surfaces in a circumferential direction of each first split core 31, and is joined together so as to narrow with the upper surface 35 as a center while sandwiching the upper surface 35 therebetween.

The forming part 32 of each first split core 31 is constituted of an inclined surface 32a (forming surface) that is connected to the upper surface 35 and is inclined with respect to the central axis, and a vertical plane 32b that is connected to the inclined surface 32a and is perpendicular to the upper surface 35 (parallel to the central axis). In addition, the inclined surface 32a is a surface that widens from the upper surface 35 toward a radial outer side, as seen in a plan view. In other words, the inclined surface 32a is an undercut forming surface that is separated from the center core 11 as the inclined surface is apart from the central axis in the radial direction (a direction that extends radially with the central axis as a center).

Additionally, an attachment hole 38 (first housing part) is provided in a surface of each first split core 31 on a radial inner side. Also, each first split core 31 is attached to the center core 11 by inserting each guide pin 19 (refer to FIG. 2) of the center core 11 into each attachment hole 38 in a state where each protrusion 33 is incorporated into each groove part 15 that overlap the guide pin 19 when the bottom surface 11b of the center core 11 is seen in the plan view.

Each second split core 41 is provided so as to face the bottom surface 11b of the center core 11, and has an upper surface 45 that abuts against the bottom surface 11b of the center core 11, a pair of inclined surfaces 47 (mating surfaces with each first split core 31: second inclined surfaces) that are inclined with respect to the central axis, a forming part 42 that abuts against the inner surface of the vertical wall part 82 of the stock 80, and a protrusion 43 that is provided on the upper surface 45 (second abutting surface). The pair of inclined surfaces 47 is both end surfaces in a circumferential direction of each second split core 41, and is joined together so as to widen with the upper surface 45 as a center while sandwiching the upper surface 45 therebetween.

The forming part 42 of each second split core 41 is constituted of an inclined surface 42a (forming surface) that is connected to the upper surface 45 and is inclined with respect to the central axis, and a vertical plane 42b that is connected to the inclined surface 42a and is perpendicular to the upper surface 45 (parallel to the central axis). In addition, the inclined surface 42a is a surface that widens from the upper surface 45 toward the radial outer side, as seen in a plan view. In other words, the inclined surface 42a is an undercut forming surface that is separated from the center core 11 as the inclined surface is apart from the central axis in the radial direction (the direction that extends radially with the central axis as a center).

Additionally, an attachment hole 48 (second housing part) is provided in a surface of each second split core 41 on the radial inner side. Also, each second split core 41 is attached to the guide core 21 by inserting each guide pin 22 of the guide core 21 into each attachment hole 48 in a state where each protrusion 43 is incorporated into each groove part 15 that is continuous with each cutout part 18 when the bottom surface 11b of the center core 11 is seen in plan view.

Here, the three first split cores 31 and the three second split cores 41 are obtained, for example, by splitting an annular forming core into six pieces in the circumferential direction.

Figure 4:
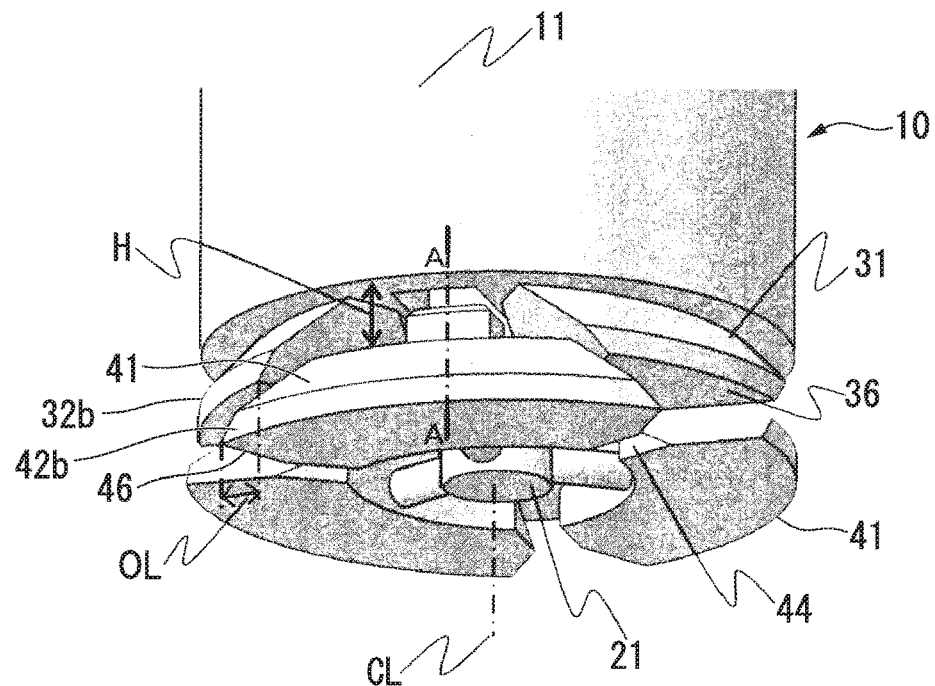
FIG. 4 is a view showing the upper forming die of the forming die, and is a perspective view showing a diameter-reduced state before forming.

FIG. 4 is a perspective view showing the upper forming die 10, and is a view showing a state before the start of forming. As described above, the first split cores 31 are attached to the center core 11, and the second split cores 41 are attached to the guide core 21. As shown in FIG. 4, the guide core 21 is movably attached to the attachment hole 13 (refer to FIG. 2) of the center core 11 such that each guide pin 22 of the guide core 21 is located a position that deviates by 60° around the central axis from each guide pin 19 of the center core 11, and is movable along the central axis. In addition, when the guide core 21 is attached to the center core 11, the stopper 23 just has to be fixed to an upper end of the guide core 21 after the guide core 21 in a state where there is no stopper 23 is inserted from below the center core 11.

In a state where the guide core 21 is attached to the center core 11, the stopper 23 abuts against the stepped part 14 formed in the center core 11 (refer to the FIG. 1A), so that the guide core 21 can be prevented from falling out from the attachment hole 13 of the center core 11 due to its own weight. In this case, the guide core 21 is brought into a state where the guide core is exposed most from the center core 11. In addition, the guide core 21 is located at a position apart by a predetermined distance in the direction of the central axis from the center core 11, and a distance between each first split core 31 and each second split core 41 (a distance between the upper surface 35 of each first split core 31 and the upper surface 45 of each second split core 41) becomes H. That is, each guide pin 22 of the guide core 21 is disposed so as to be separated by the distance H downward in the direction of the central axis from each guide pin 19 of the center core 11.

Additionally, as shown in FIG. 4, in a state before the start of forming (a state where the guide core 21 is exposed most from the center core 11), as seen from the axis of the central axis, the first split cores 31 and the second split cores 41 are alternately disposed around the central axis such that a portion of the bottom surface 36 of each first split core 31 overlaps the bottom surface 46 of each second split core 41. In addition, in the present specification, a state where a portion of the bottom surface 36 of each first split core 31 overlaps the bottom surface 46 of each second split core 41 is referred to as a "diameter-reduced state". That is, in the diameter-reduced state, portions of the inclined surfaces 37 of each first split core 31 overlap the inclined surfaces 47 of each second split core 41. Additionally, in the diameter-reduced state, as seen from the axis of the central axis, the three first split cores 31 and the three second split cores 41 are covered with the center core 11 (are present inside an outer edge of the center core 11).

Since each guide pin 19 of the center core 11 is inserted into the attachment hole 38 of each first split core 31, each first split core 31 slides along each guide pin 19 (in the radial direction). Also, the distance of the forming part 32 of each first split core 31 from the vertical plane 32b to the central axis of the center core 11 is smaller than the radius of the bottom surface 11b of the center core 11 in the diameter-reduced state.

Since each guide pin 22 of the guide core 21 is inserted into the attachment hole 48 of each second split core 41, each second split core 41 slides along the guide pin 22. Also, the distance of the forming part 42 of each second split core 41 from the vertical plane 42b to the central axis is smaller than the radius of the bottom surface 11b of the center core 11 in the diameter-reduced state.

Next, the method of forming the undercut part 86 in the stock 80 using the forming die 1 related to the present embodiment will be described. First, as shown in FIG. 1A, the stock 80 is placed within the lower forming die 60 such that an outer surface of the cup-like stock 80 comes into contact with an inner surface of the lower forming die 60. In a state where the stock 80 is placed within the lower forming die 60, the bottom wall part 84 of the stock 80 abuts against the bottom part 61 of the lower forming die 60, and the vertical wall part 82 of the stock 80 abuts against the side wall part 62 of the lower forming die 60.

Subsequently, the upper forming die 10 is inserted into the stock 80. In this case, the guide core 21 is brought into a state where the guide core is exposed most from the center core 11, and the first split cores 31 and the second split cores 41 are in the diameter-reduced state where these split cores do not protrude further to the radial outer side than the bottom surface 11b of the center core 11. That is, as seen from the axis of the central axis, the first split cores 31 and the second split cores 41 are brought into a state where these split cores are covered with the bottom surface 11b of the center core 11.

Additionally, as shown in FIG. 1A, a predetermined gap is provided between the outer peripheral surface 11a of the center core 11 and the inner surface of the vertical wall part 82 of the stock 80. Also, the push-in die 70 is disposed above the stock 80 between the lower forming die 60 and the upper forming die 10 so as to touch the inner surface of the lower forming die 60 and the outer peripheral surface 11a of the center core 11.

Figure 1B:
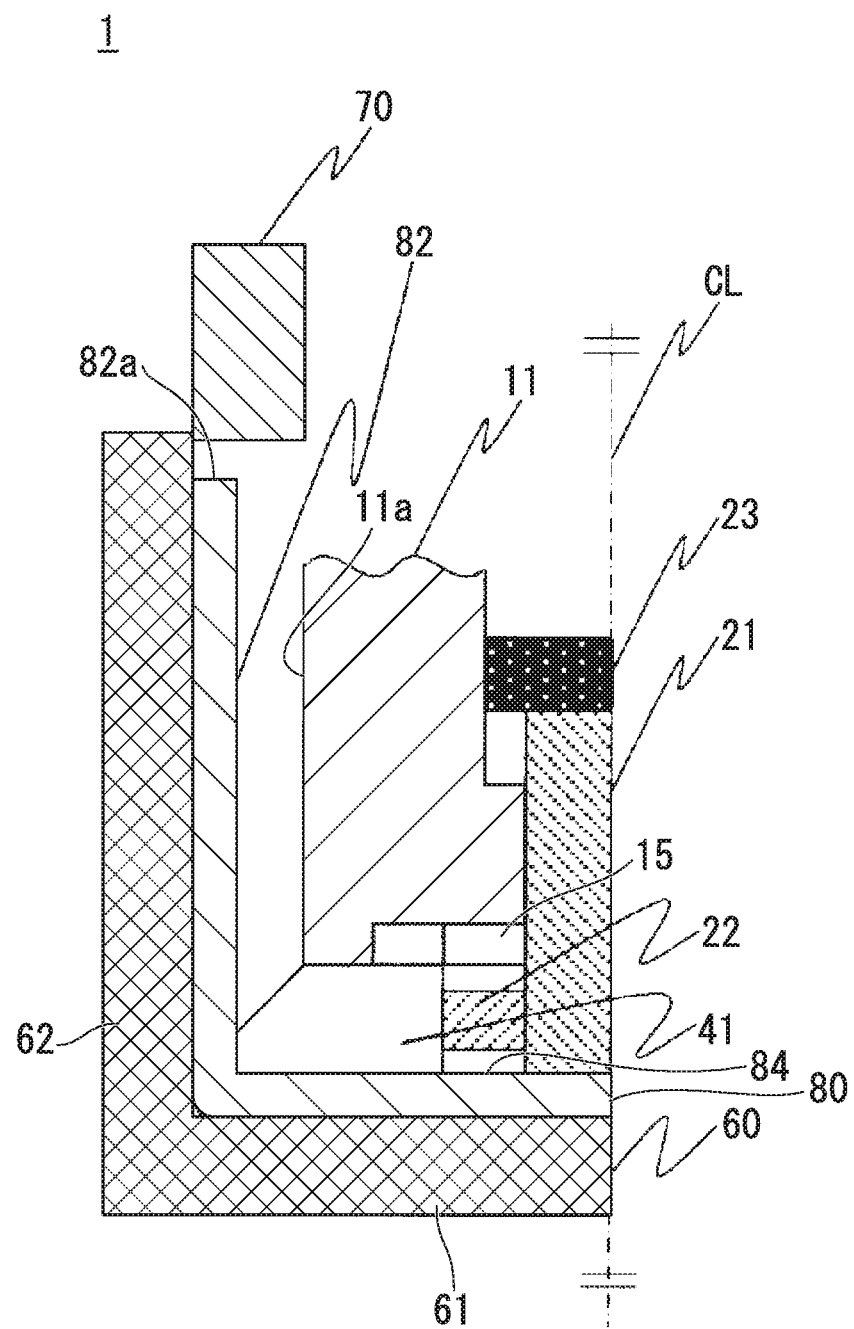
FIG. 1B is a view showing the forming die, and is a longitudinal sectional view showing a state where an upper forming die is lowered to a bottom dead center.

Next, as shown in FIG. 1B, the center core 11 is lowered along the central axis, and the bottom surface 46 of each second split core 41 is brought into contact with the bottom wall part 84 of the stock 80. By bringing the bottom surface 46 of each second split core 41 into contact with the bottom wall part 84 of the stock 80, the guide core 21 is pushed up and the stopper 23 in contact with the stepped part 14 of the center core 11 is detached from the center core 11. Therefore, the center core 11 is lowered relative to the guide core 21 by further lowering the center core 11.

That is, in a state shown in FIG. 1A, each first split core 31 is at a position high by the distance H than each second split core 41, and as the center core 11 is lowered, the distance H becomes gradually small. Then, as the inclined surfaces 37 of each first split core 31 and the inclined surfaces 47 of each second split core 41 adjacent to each other in the circumferential direction come in contact with each other, each first split core 31 moves along each guide pin 19 of the center core 11, and each second split core 41 moves along the guide pin 22 of the guide core 21. That is, each first split core 31 is pressed against each second split core 41 due to the lowering of the center core 11, the second split core 41 moves toward the radial outer side, and the first split core 31 moves toward the radial outer side due to a reaction force received from the second split core 41.

Figure 5:
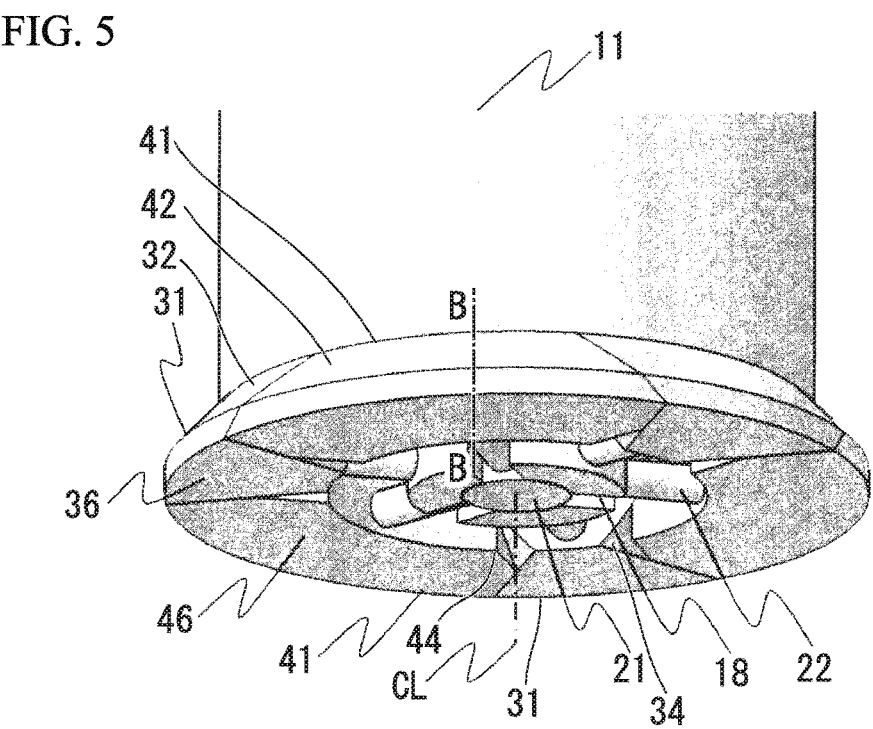
FIG. 5 is a view showing the upper forming die, and is a perspective view showing a diameter-increased state when the upper forming die is lowered to the bottom dead center.

As a result, as shown in FIG. 5, each first split core 31 and each second split core 41 moves toward the radial outer side, respectively, and the upper surface 35 of the first split core 31 and the upper surface 45 of the second split core 41 coincide with each other in a case where the bottom surface 36 of the first split core 31 and the bottom surface 46 of the second split core 41 are seen along the central axis. In other words, the inclined surfaces 37 of the first split core 31 and the inclined surfaces 47 of the second split core 41 adjacent to each other in the circumferential direction are brought into a state where these inclined surfaces are joined together. In addition, in the present embodiment, the state as shown in FIG. 5 where the inclined surfaces 37 of the first split core 31 and the inclined surfaces 47 of the second split core 41 adjacent to each other in the circumferential direction are joined together is referred to as "diameter-increased state". In the diameter-increased state, the forming part 32 of each first split core 31 and the forming part 42 of each second split core 41 protrude from the outer peripheral surface 11a of the center core 11 in a plan view.

In addition, as shown in FIG. 5, cutout parts 34 and 44 are respectively provided in each first split core 31 and each second split core 41. Therefore, when the first split cores 31 and the second split cores 41 move in the radial direction, the first split cores 31 and the second split cores 41 can be prevented from interfering with each other.

Additionally, as shown in FIG. 5, in the diameter-increased state, the forming part 32 of each first split core 31 and the forming part 42 of each second split core 41 are smoothly continuous, and the three first split cores 31 and the three second split cores 41 forms one disk shape. From above, the preparation for forming the undercut part 86 in the stock 80 is completed.

In addition, in the diameter-increased state, each first split core 31 is positioned with respect to the center core 11 by the side surface 33a (radial outside surface) of the protrusion 33 of the first split core 31 abutting against the abutting surface 16 of each groove part 15 of the center core 11 and the upper surface 35 of the first split core 31 abutting against the bottom surface 11b of the center core 11, (refer to FIGS. 2 and 3). Additionally, each second split core 41 is positioned with respect to the center core 11 by the side surface 43a of the protrusion 43 of the second split core 41 abutting against the abutting surface 16 of the groove part 15 of the center core 11 and the upper surface 45 of the second split core 41 abutting against the bottom surface 11b of the center core 11.

Figure 1C:
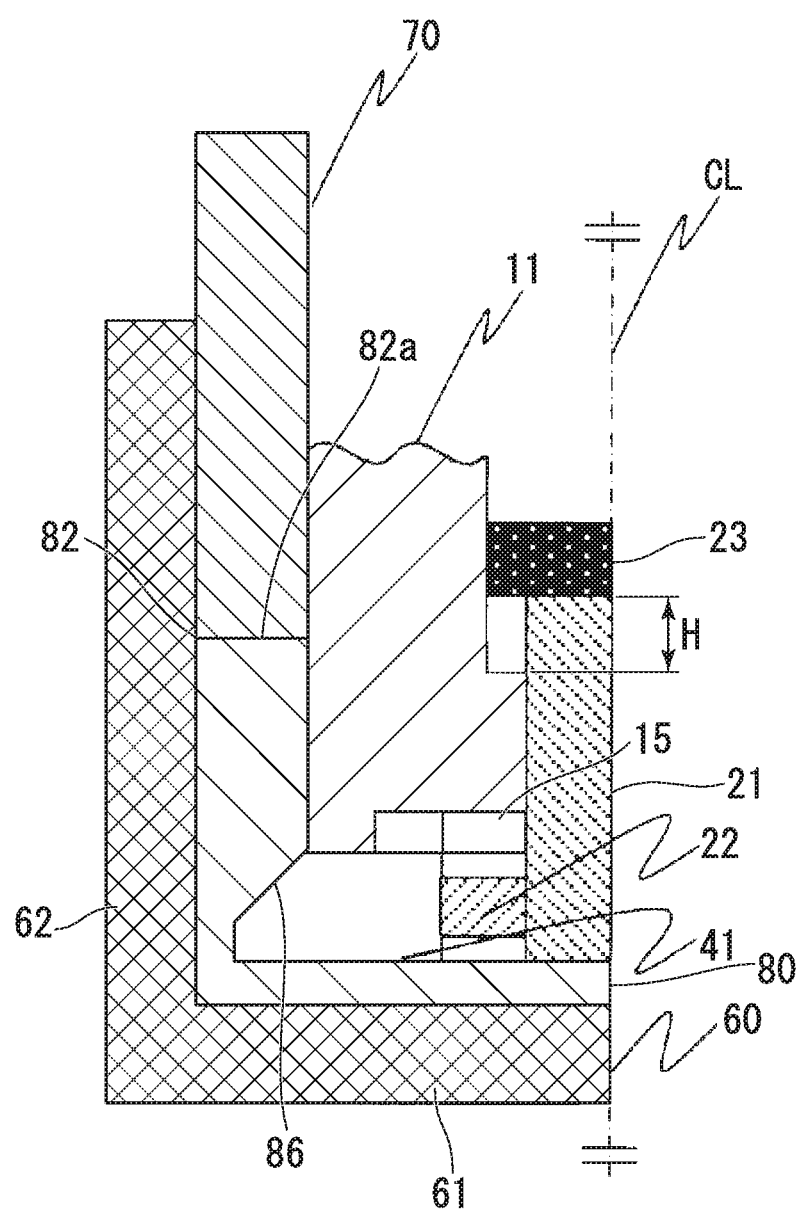
FIG. 1C is a view showing the forming die, and is a longitudinal sectional view showing a state where a stock is pressed by a push-in die.

Next, as shown in FIG. 1C, the push-in die 70 is lowered to press the upper end surface 82a of the vertical wall part 82 of the stock 80. In this case, since the vertical wall part 82 of the stock 80 is constrained by the side wall part 62 of the lower forming die 60, a portion of the vertical wall part 82 of the stock 80 is increased in thickness by pressing the upper end surface 82a of the vertical wall part 82 of the stock 80. As a result, the undercut part 86 can be formed in the stock 80.

Figure 1D:
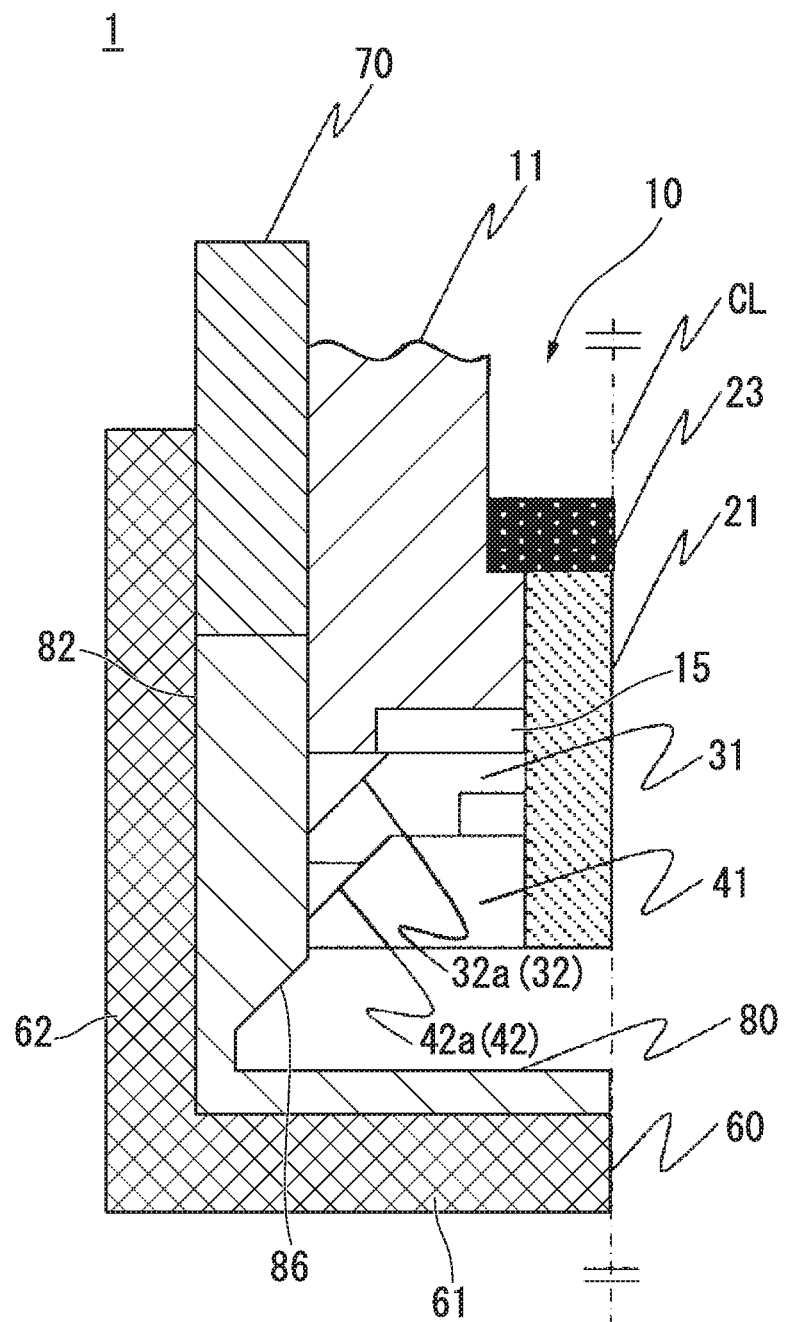
FIG. 1D is a view showing the forming die, and is a longitudinal sectional view showing a state where the upper forming die is pulled out from a stock.

Subsequently, as shown in FIG. 1D, in order to extract the upper forming die 10 from a stock 80, the center core 11 is raised along the central axis. Similarly, since the inclined surface 32a of the forming part 32 comes into contact with the undercut part 86 of the stock 80, each first split core 31 is pushed to the radial inner side. In this case, since the inclined surface 42a of the forming part 42 comes into contact with the undercut part 86 of the stock 80, each second split core 41 is pushed to the radial inner side.

When the center core 11 is raised, the stopper 23 of the guide core 21 is separated by the distance H from the stepped part 14 of the center core 11 to the upper side of the central axis (refer to FIG. 1C). Therefore, if the center core 11 is raised along the central axis, each second split core 41 is separated from the center core 11 along the central axis. Consequently, when forces facing the radial inner side have acted on each first split core 31 and each second split core 41, any interference between the first split core 31 and the second split core 41 can be avoided. Therefore, the first split core 31 and the second split core 41 can each be moved toward the radial inner side, and the upper forming die 10 can be extracted from the stock 80.

Figure 1E:
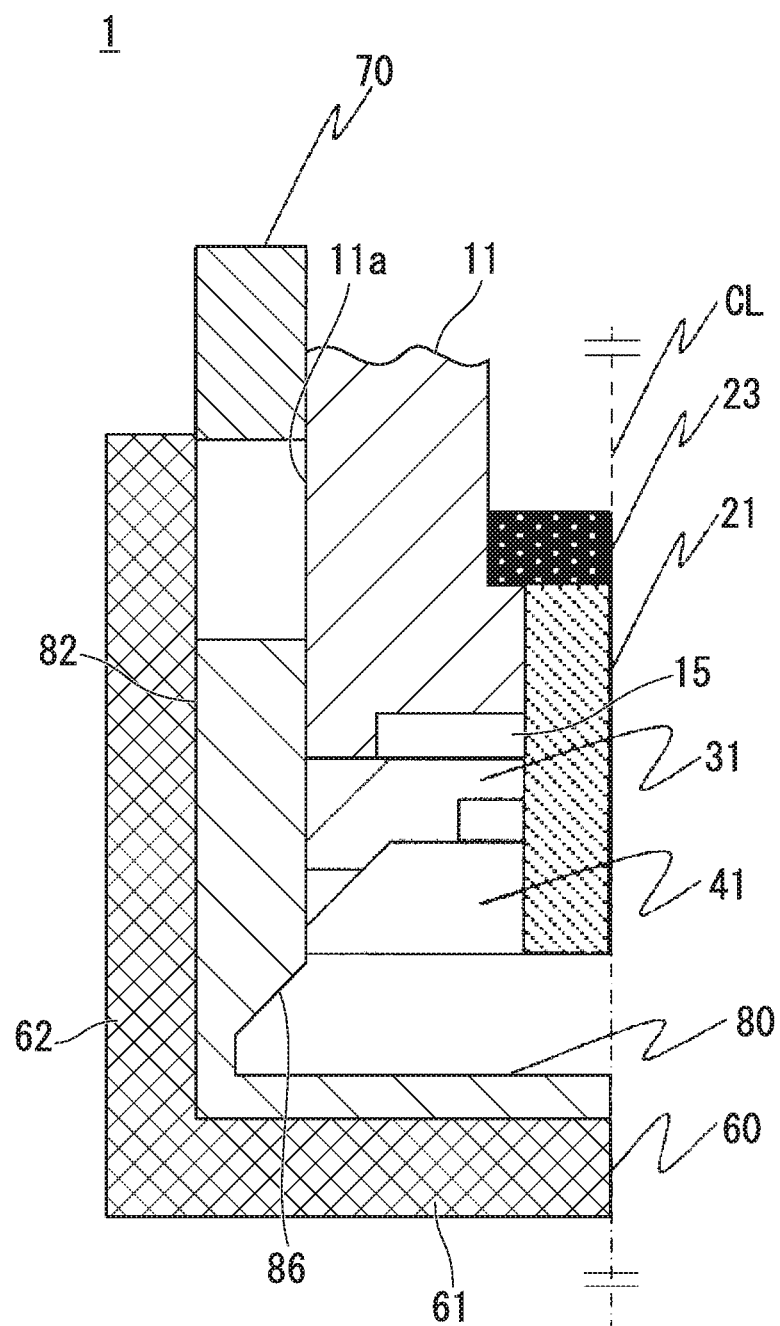
FIG. 1E is a view showing the forming die, and is a longitudinal sectional view showing a state where the push-in die is raised.

Finally, as shown in FIG. 1E, the stock 80 can be taken out from the lower forming die 60 by raising the push-in die 70.

As described above, the diameter-increasing operation and the diameter-reducing operation of the first split cores 31 are performed by the attachment holes 38 of the first split cores 31 and the guide pins 19 of the center core 11. Therefore, by the diameter-increasing operation and the diameter-reducing operation of the first split cores 31, the side surface 33a of the protrusion 33 of each first split core 31, the upper surface 35 of the first split core 31, the abutting surface 16 of the center core 11, and the bottom surface 11b of the center core 11 are not worn out, and a decline in positioning accuracy can be prevented.

Similarly, the diameter-increasing operation and the diameter-reducing operation of the second split cores 41 are performed by the guide holes 48 of the second split cores 41 and the guide pins 22 of the guide core 21. Therefore, by the diameter-increasing operation and the diameter-reducing operation of the second split cores 41, the side surface 43a of the protrusion 43 of each second split core 41, the upper surface 45 of the second split core 41, the abutting surface 16 of the center core 11, and the bottom surface 11b of the center core 11 are not worn out, and a decline in positioning accuracy can be prevented.

Figure 6:
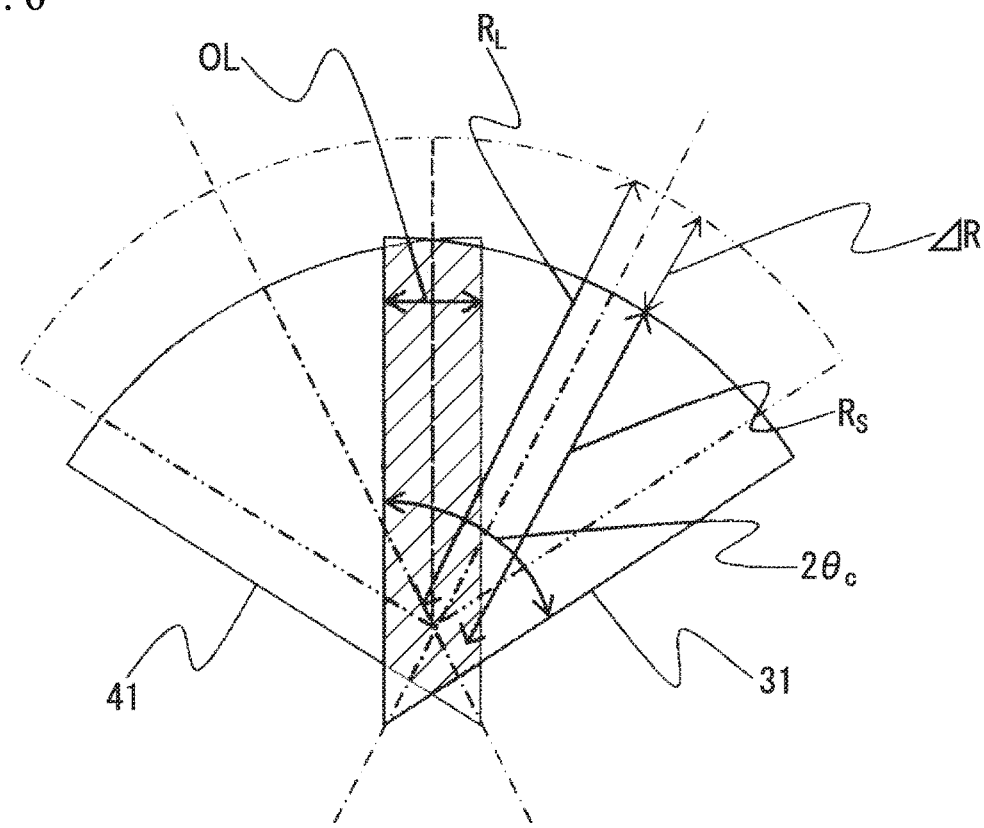
FIG. 6 is a view for explaining the operation of each first split core and each second split core of the upper forming die, and is a plan schematic view showing a diameter-reduced state before forming.

Next, respective parameters of each first split core 31 and each second split core 41 will be described with reference to FIGS. 6 and 7. FIG. 6 is a plan schematic view showing each first split core 31 and each second split core 41 as seen from the direction of the central axis in the diameter-reduced state. In addition, in FIG. 6, a region where the first split core 31 overlaps the second split core 41 is shown by hatching.

The radius of the first split core 31 and the second split core 41 in the diameter-increased state is defined as $R_L$, the radius of the first split core 31 and the second split core 41 in the diameter-reduced state is defined as $R_S$, the radial movable distance of the first split core 31 and the second split core 41 is defined as $\Delta R$, the total core number (the number of times of core splitting) of the first split core 31 and the second split core 41 is defined as N, the core angle of the first split core 31 and the second split core 41 is defined as $2\theta_c$ [rad], and the radius of the center core 11 is defined as r. In this case, the core angle $2\theta_c$ becomes $\theta_c=\pi/N$. If the condition ($R_S \leq r$) for pulling out the forming part 32 of the first split core 31 and the forming part 42 of the second split core 41 from the stock 80 in which the undercut part 86 is formed are taken into consideration, a radial movable distance $\Delta R$ of the first split core 31 and the second split core 41 is expressed by the following Formula (1) from a geometric shape.

[Formula 1]

$$\Delta R = R_L \cos\theta_c - r \sin[\arccos\{(R_L/r)\sin\theta_c\}] \quad (1)$$

Additionally, if an angle formed between the bottom surface 36 and each inclined surface 37 of the first split core 31 is defined as $\theta_1$ [rad], and an angle formed between the bottom surface 46 and each inclined surface 47 of the second split core 41 is defined as $\theta_2$ [rad] (refer to FIG. 3), there is a relationship of $\theta_1=\pi-\theta_2$. Also, if the amount of overlap between the first split core 31 and the second split core 41 in the diameter-reduced state shown in FIG. 6 is defined as OL, OL is expressed by the following Formula (2).

[Formula 2]

$$OL = 2\Delta R \sin\theta_c \quad (2)$$

If a required minimum distance of the movement distance of the guide core 21 along the central axis is defined as $\Delta H$, $\Delta H$ is expressed by the following Formula (3).

[Formula 3]

$$\Delta H = OL \tan(\theta_2) \quad (3)$$

$\Delta H$ is expressed by the following Formula (4) by substituting the above Formulas (1) and (2) in the above Formula (3).

[Formula 4]

$$\Delta H = 2 \times [R_L \cos\theta_c - r \sin[\arccos\{(R_L/r)\sin\theta_c\}] \times \sin\theta_c \quad (4)$$

Figure 7:
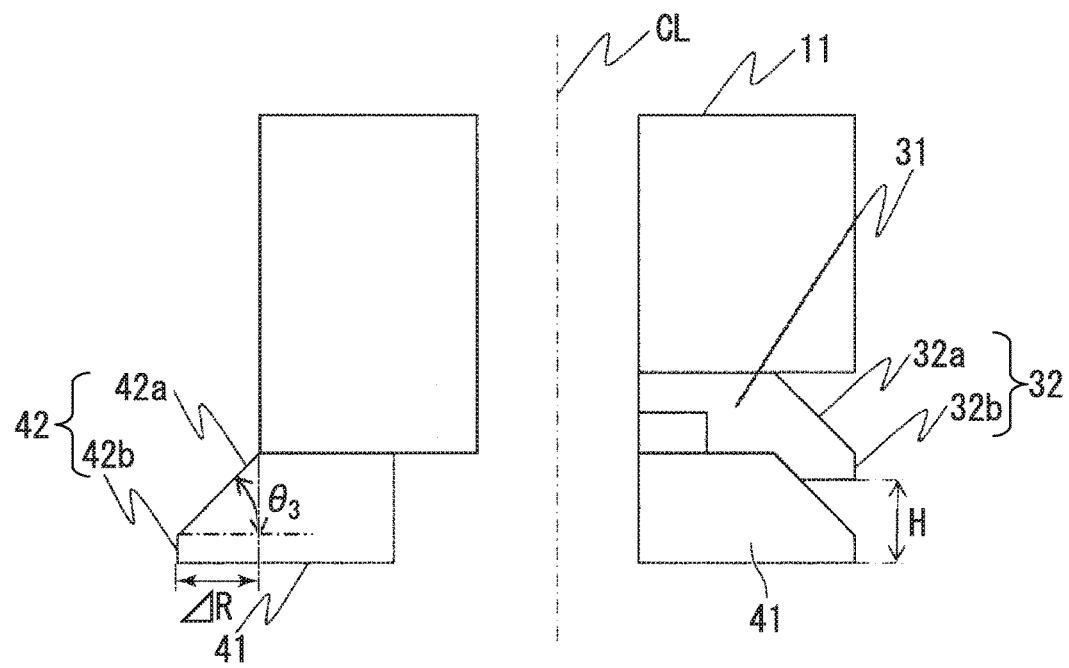
FIG. 7 is a view for explaining the operation of each first split core and each second split core of the upper forming die, and a longitudinal sectional view as seen in a section including the axis of the upper forming die.

FIG. 7 is a front schematic view showing each first split core 31 and each second split core 41. In addition, a right view of FIG. 7 shows an A-A sectional view of FIG. 4, and a left view of FIG. 7 shows a B-B sectional view of FIG. 5. If an angle between the inclined surface 32a of the forming part 32 of the first split core 31 and the bottom surface 36 of the first split core 31 and an angle between the inclined surface 42a of the forming part 42 of the second split core 41 and the bottom surface 46 of the second split core 41 are defined as $\theta_3$ [rad], the distance H in the direction of the central axis between the first split core 31 and the second split core 41 is expressed by the following Formula (5).

[Formula 5]

$$H = \Delta R \tan(\theta_3) \quad (5)$$

The required minimum distance $\Delta H$ is expressed by the following Formula (6) from the above Formula (3) and (5).

[Formula 6]

$$\Delta H = OL \tan(\theta_2) \leq \Delta R \tan(\theta_3) \quad (6)$$

$\theta_3$ is expressed by the following Formula (7) by substituting the above Formula (3) in the above Formula (6).

[Formula 7]

$$\theta_3 \geq \arctan\{2\sin\theta c \cdot \tan(\theta_2)\} \quad (7)$$

According to the above Formulas (1) to (7), the respective parameters when forming the undercut part 86 in the stock 80 can be determined. In the present embodiment, a case where the number N of times of core splitting is 6. However, the number of N just has to be four or more. In addition, it is preferable that the number N of times of core splitting is 6 because the number of components is small. Additionally, in order to prevent forces acting on forming components from concentrating in one direction, it is preferable that the angle $\theta_1$ of the first split core 31 is $2\pi/3 \leq \theta_1 \leq 5\pi/6$, and it is preferable that the angle $\theta_3$ of the first split core 31 and the second split core 41 is $\pi/6 \leq \theta_3 \leq \pi/3$.

Additionally, in the present embodiment, the materials of the first split core 31 and the second split core 41 are SKD11, and the materials of each guide pin 19 of the center core 11 and each guide pin 22 of the guide core 21 are S45C. In this way, if material selection is performed such that the hardness of the guide pin 19 of the center core 11 and the guide pin 22 of the guide core 21 become lower than the hardness of the first split core 31 and the second split core 41, the guide pins 19 and 22 with lower hardness is first worn out. Therefore, when maintenance against wear factors is performed, the replacement frequency of the guide pins 19 and 22 can be enhanced, and the replacement frequency of the relatively expensive first split core 31 and second split core 41 can be suppressed. Consequently, an increase in die cost resulting from wear factors can be suppressed.

According to the present embodiment described above, each first split core 31 and each second split core 41 are disposed so as to overlap each other in the diameter-reduced state, and the center core 11 presses the inclined surfaces 37 of the first split core 31 against the inclined surfaces 47 of the second split core 41, the first split core 31 and the second split core 41 move toward the radial outer side while sliding on each other.

Additionally, since the forming part 32 of the first split core 31 has the inclined surface 32a and the forming part 42 of the second split core 41 has the inclined surface 42a, the first split core 31 and the second split core 41 move to the radial inner side when pulling out the upper forming die 10 along the axis of the central axis from the stock 80.

Consequently, since a sliding mechanism of the die that forms an undercut can be made simple, the undercut part 86 can be formed in the stock 80 at low cost.

Here, in the related art, in a case where a thick formed product having an undercut part is formed, the thick formed product having the undercut part is formed from a thick stock by cutting work. In contrast, in the present embodiment, the undercut part 86 can be formed in the stock 80, and the thickness of the stock 80 can be increased. Therefore, for example, a thick formed product having an undercut part can be formed from a thin stock. Consequently, since a thick formed product having an undercut part can be formed by press working, cost reduction can be achieved.

<Modification Example of Forming Die>

Figure 8:
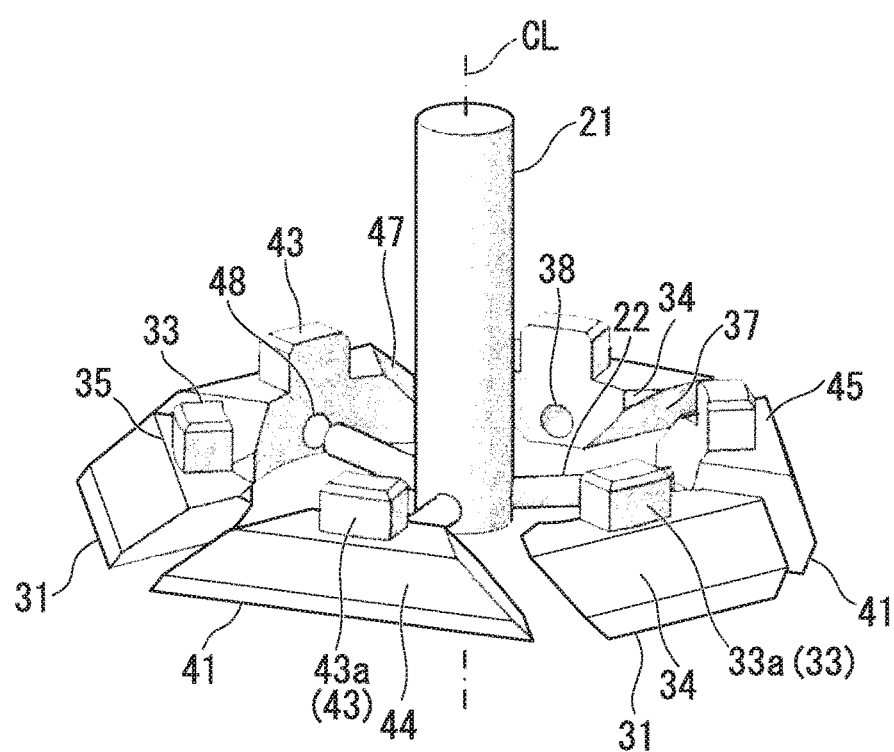
FIG. 8 is a perspective view showing a modification example of the first split cores and the second split cores of the upper forming die.

In the present embodiment, a case where the annular forming core is split into the first split cores and the second split cores is shown. However, a forming core having a polygonal shape in a plan view may be split into the first split cores and the second split cores. For example, as shown in FIG. 8, a forming core having a hexagonal shape in a plan view may be split into the three first split cores and the three second split cores. In this way, in a case where the forming core having a polygonal shape is split, the number of vertices of the polygon needs to be even. In addition, in a case where the number of vertices of a polygonal shape is equal to a number obtained by totaling the number of the first split cores 31 and the second split cores 41, in order to make the radial movable distance ΔR of each first split core 31 and the second split core 41, it is preferable to dispose the axial center of each guide pin 22 on a surface formed by the central axis CL of the center core 11 and the vertices of the polygonal shape.

Figure 9A:
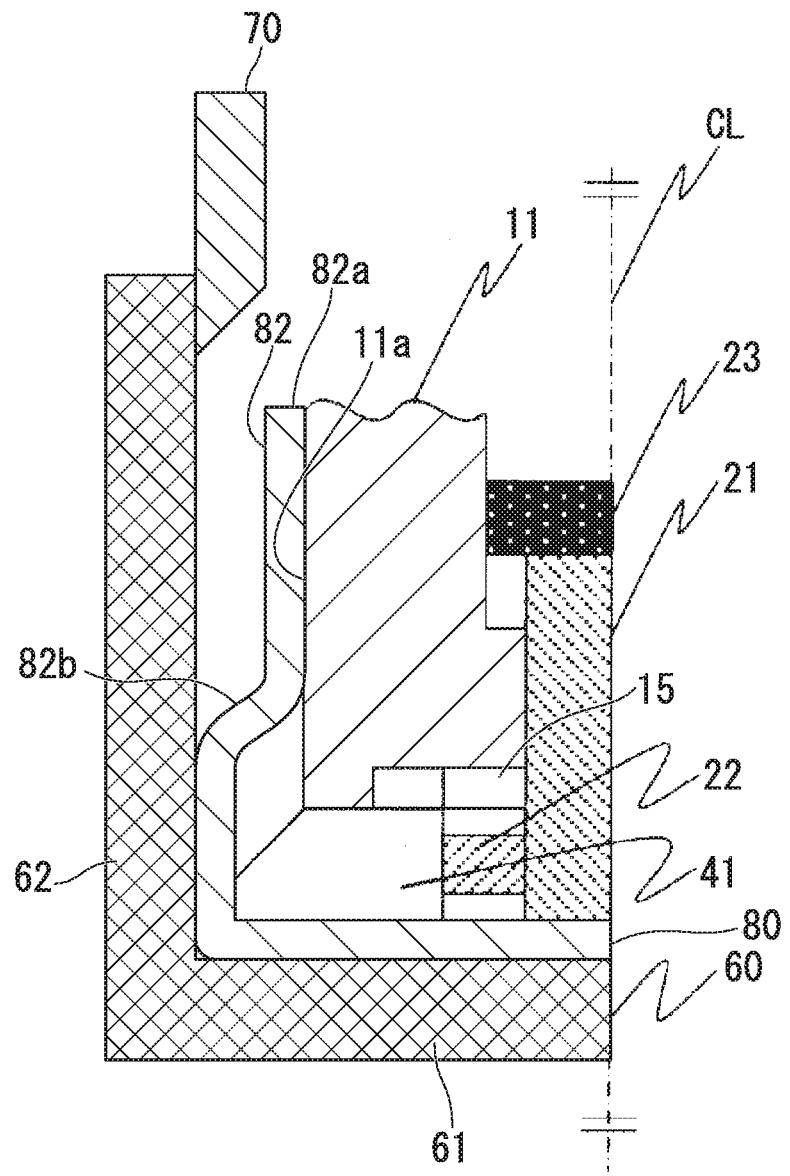
FIG. 9A is a longitudinal sectional view showing a modification example of an undercut forming method using the forming die related to the above first embodiment.
Figure 9B:
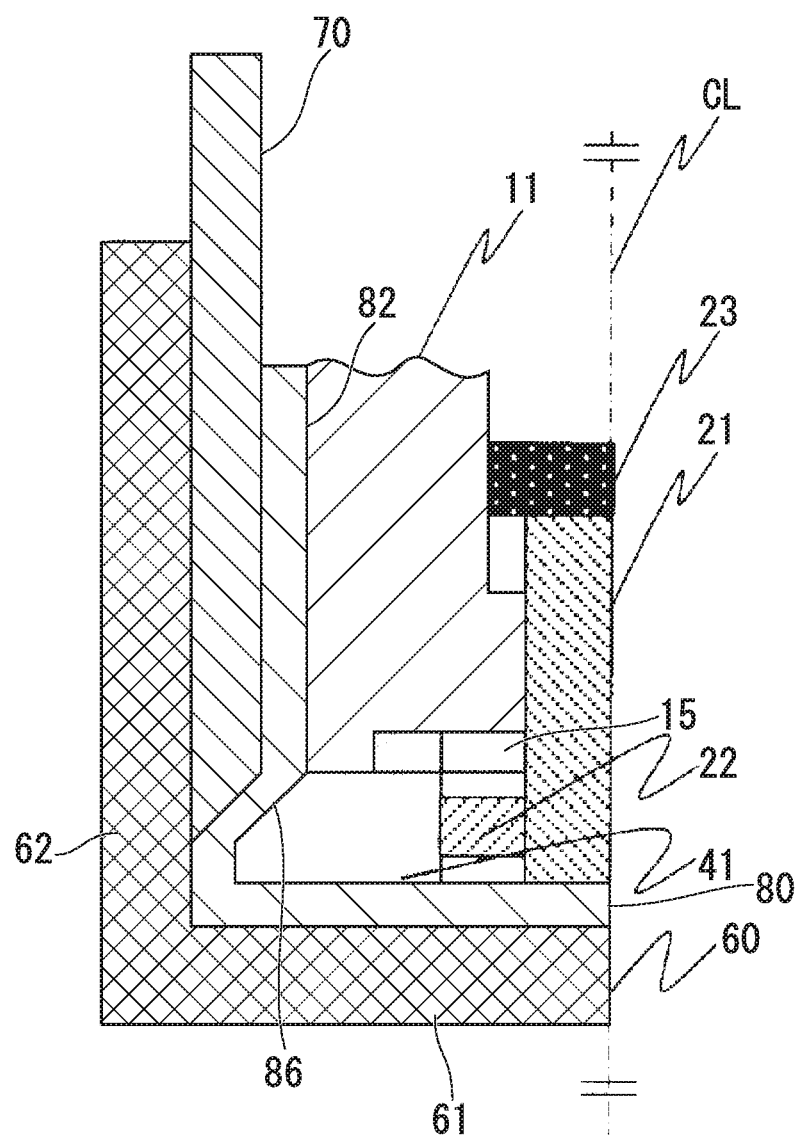
FIG. 9B is a longitudinal sectional view showing the continuation of the forming method according to the modification example.

Additionally, in the present embodiment, a case where the undercut part 86 is formed as the push-in die 70 presses the upper end surface 82a of the stock 80 to increase the thickness of the stock 80. However, as shown in FIGS. 9A and 9B, the vertical wall part 82 of the stock 80 may have a shape along the forming part 32 of each first split core 31 and the forming part 42 of each second split core 41 by forming a stepped part 82b in advance in the vertical wall part 82 of the stock 80, and pushing in the push-in die 70 between the vertical wall part 82, and the side wall part 62 of the lower forming die 60 having the inclined surface at the tip thereof. Even in this case, the undercut part 86 can be formed in the stock 80.

Second Embodiment

Next, a forming die 200 related to a second embodiment of the invention will be described. In addition, the same constituent elements as the above-described constituent element will be designated by the same reference signs, and thereby, the duplicate description thereof will be omitted below.

Figure 10A:
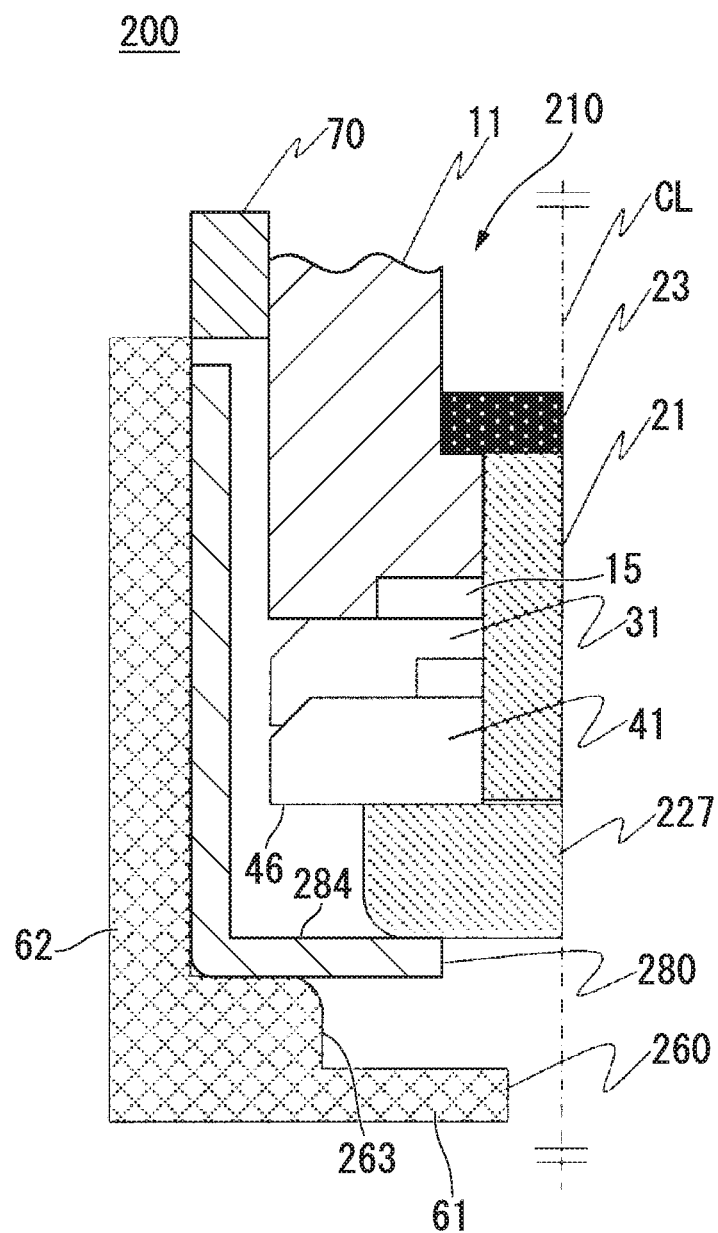
FIG. 10A is a view showing a forming die related to a second embodiment of the invention, and is a longitudinal sectional view showing a half on the left of an axis of the forming die in a section including the axis.

FIGS. 10A to 10D are longitudinal sectional views showing the forming die 200 related to the present embodiment. As shown in FIG. 10A, the forming die 200 is different from the forming die 1 related to the above first embodiment in that a columnar punch part 227 is provided at the lower end of the guide core 21 and a stepped part 263 is provided at a lower end of the side wall part 62 of the lower forming die 260.

Additionally, in the above first embodiment, a case where the undercut part 86 is formed in the stock 80 in which hole is not provided in the bottom wall part 84. In contrast, the forming die 200 related to the present embodiment is used when forming the undercut part 86 and a boss part 285 in a stock 280 having a bottom wall part 284 in which the circular hole is provided (refer to FIG. 10D).

A method of forming the undercut part 86 and the boss part 285 in the stock 280 will be described with reference to FIGS. 10A to 10D. First, as shown in FIG. 10A, the stock 280 is placed on the lower forming die 260 such that the bottom wall part 284 of the stock 280 abuts against the stepped part 263 of the lower forming die 260. Thereafter, the upper forming die 210 is inserted into the stock 280, and the punch part 227 is made to abut against the bottom wall part 284 of the stock 280.

Figure 10B:
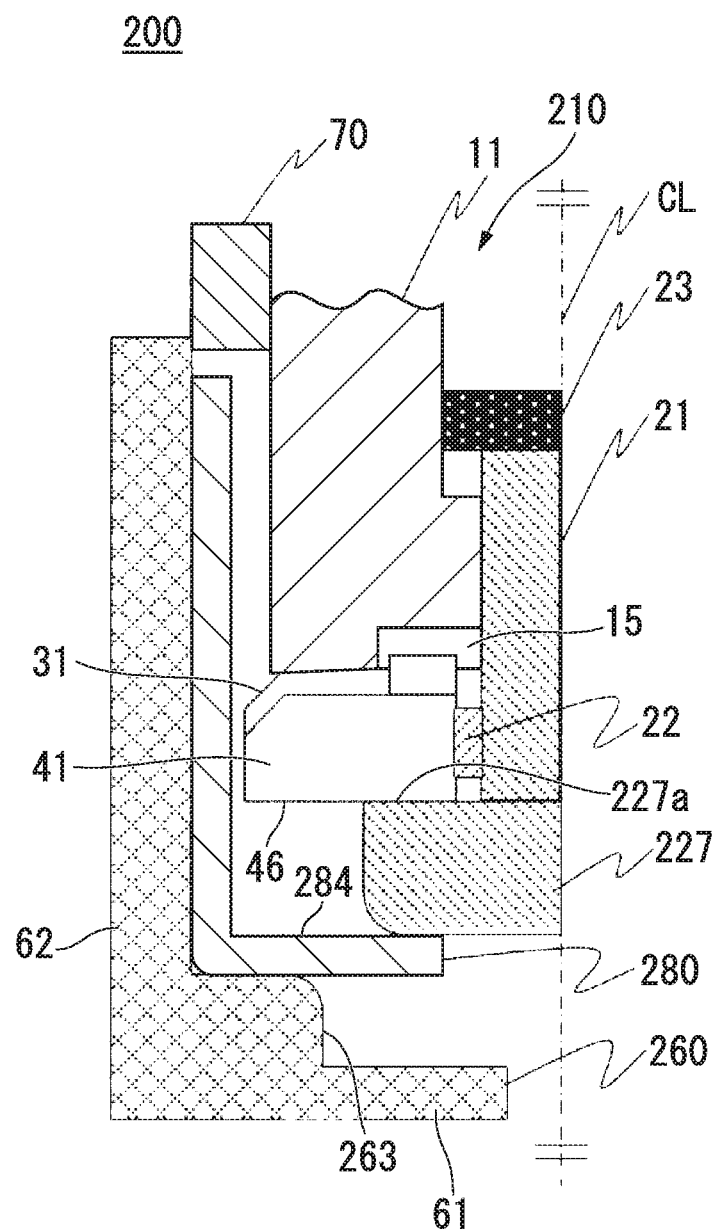
FIG. 10B is a longitudinal sectional view showing the continuation of a forming method using the forming die.

Subsequently, as shown in FIG. 10B, the center core 11 is lowered. In this case, since the bottom surface 46 of each second split core 41 abuts against an upper surface 227a of the punch part 227, the movement of the second split core 41 in the direction of the central axis is restricted. Therefore, each first split core 31 is pressed against each second split core 41 by lowering the center core 11. Accordingly, the first split cores 31 and the second split cores 41 begin to increase in diameter toward the radial outer side. Then, if the first split cores 31 and the second split cores 41 reach diameter-increased state, the pressing force of the center core 11 is transmitted to the punch part 227 via the first split cores 31 and the second split cores 41.

Figure 10C:
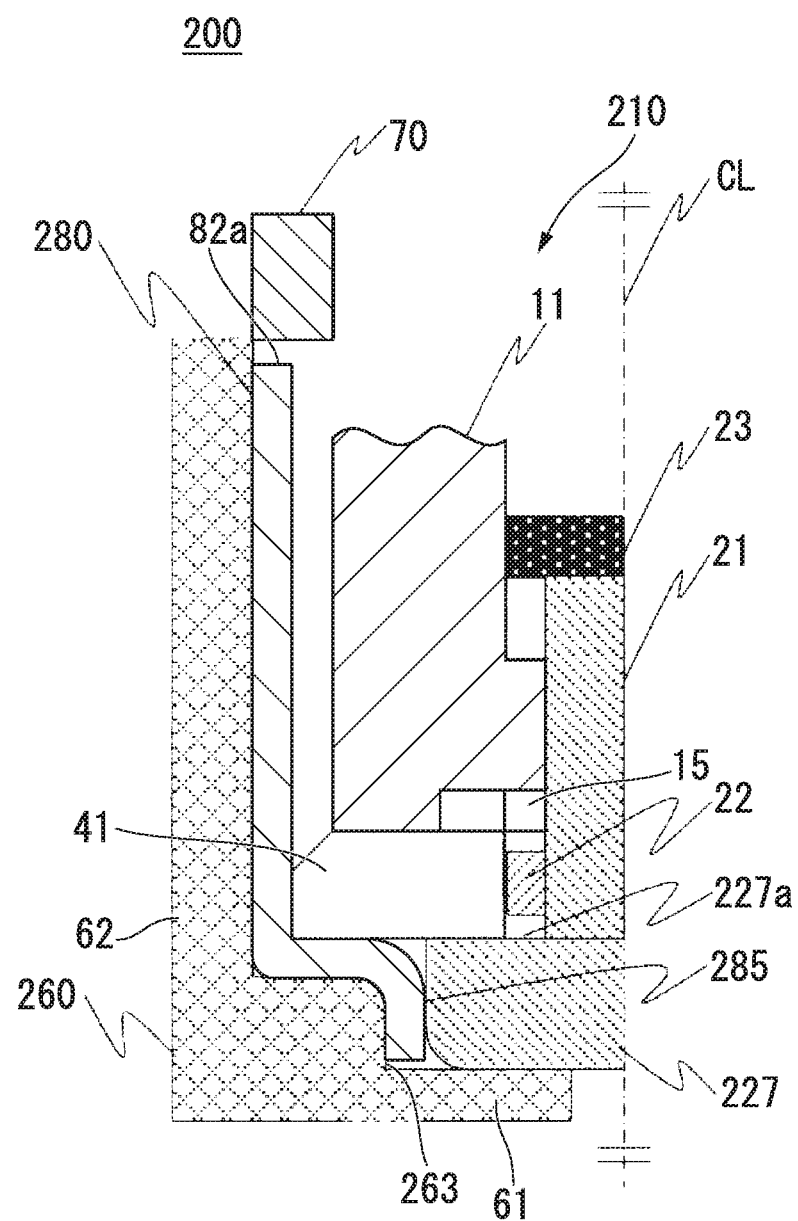
FIG. 10C is a longitudinal sectional view showing the continuation of the forming method using the forming die.
Figure 10D:
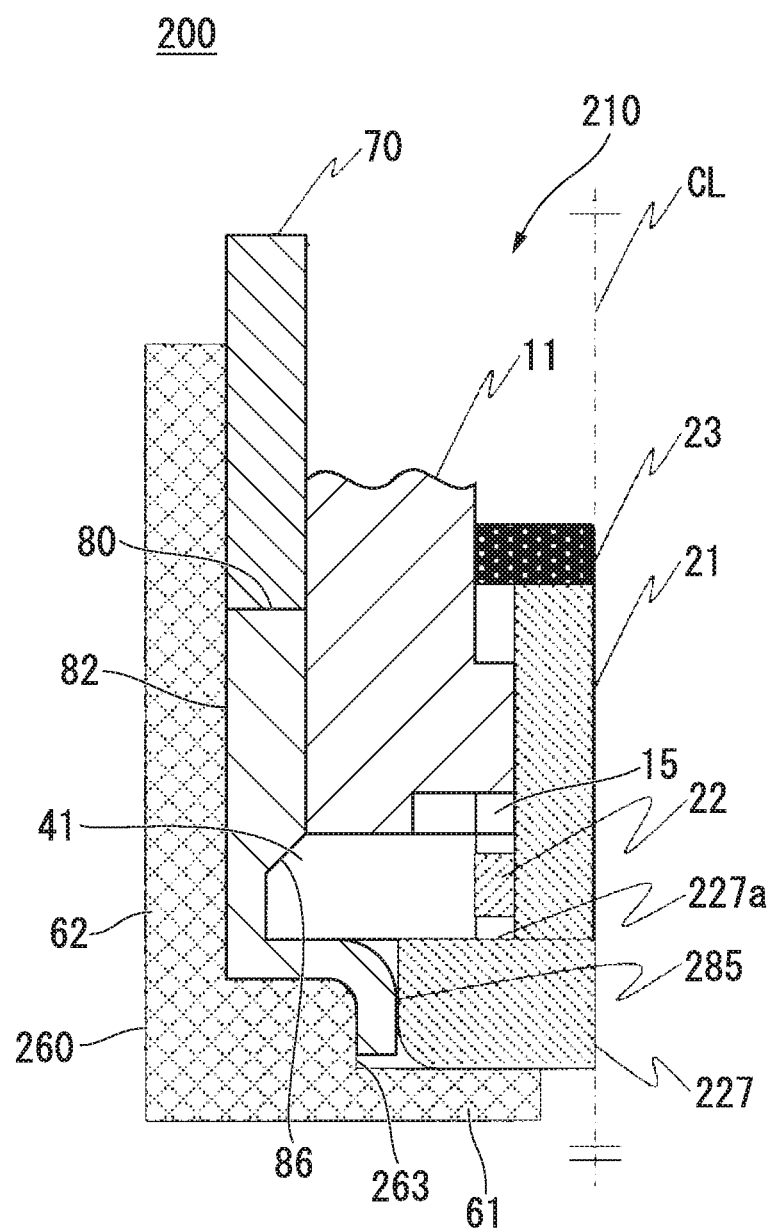
FIG. 10D is a longitudinal sectional view showing the continuation of the forming method using the forming die.

Subsequently, if the center core 11 is further pushed in from the state shown in FIG. 10B, as shown in FIG. 10C, the bottom wall part 284 of the stock 280 is formed for hole expansion by the punch part 227, and the boss part 285 is formed. Thereafter, by lowering the push-in die 70 to press the upper end surface 82a of the stock 280 similar to the first embodiment, as shown in FIG. 10D, the undercut part 86 is formed in the stock 280. In addition, since the processes after this are the same as those of the first embodiment, a description thereof will be omitted.

The undercut part 86 and the boss part 285 can be formed in the stock 280 by the above-described forming method. In addition, a disk having a circular hole can also be used instead of the stock 280. In this case, the above disk is subjected to cupping draw in a cup by the punch part 227, the bottom surface 36 of each first split core 31, the bottom surface 46 of each second split core 41, and the lower forming die 260, and is formed in the state of FIG. 10C.

Third Embodiment

Next, a forming die 300 related to a third embodiment of the invention will be described. In addition, the same constituent elements as the above-described constituent element will be designated by the same reference signs, and thereby, a duplicate description thereof will be omitted below.

Figure 11A:
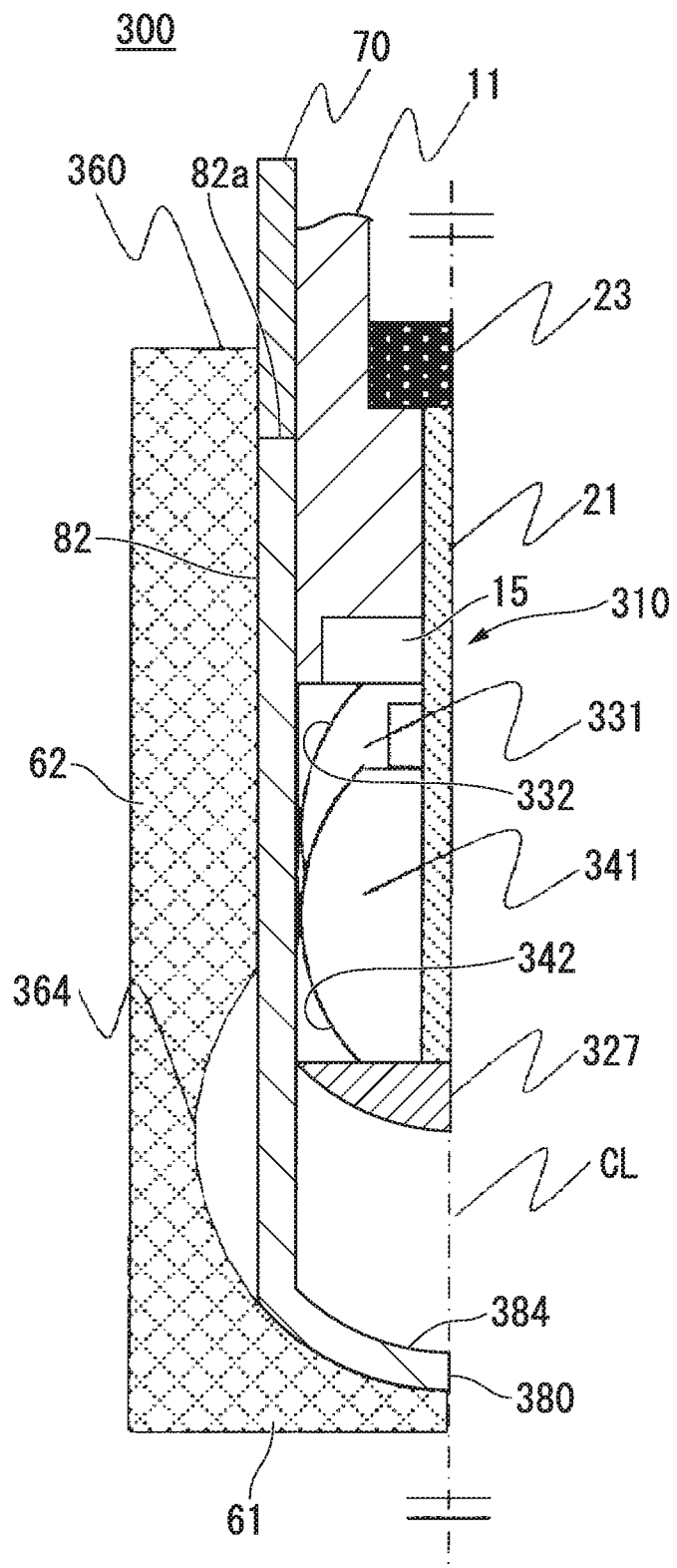
FIG. 11A is a view showing a forming die related to a third embodiment of the invention, and is a longitudinal sectional view showing a half on the left of an axis of the forming die in a section including the axis.

FIGS. 11A to 11D are longitudinal sectional views showing the forming die 300 related to the present embodiment. As shown in FIG. 11A, in the forming die 300, an upper forming die 310 has first split cores 331 each having a curved surface-shaped (convex surface) forming part 332, second split cores 341 each having curved surface-shaped (convex surface) forming part 342, and a hemispherical punch part 327 provided at the lower end of the guide core 21. Additionally in the forming die 300, a curved part 364 (concave surface) is provided in the lower forming die 360.

In the above first embodiment, a case where the undercut part 86 is formed by increasing the thickness of the vertical wall part 82 of the cup-like stock 80 is shown. However, in the present embodiment, the undercut part 386 is formed by the first split cores 331 and the second split cores 341 pressing an inner surface of the stock 380, and a reduction in the thickness of the undercut part 386 is suppressed by pushing in the upper end surface 82a of the vertical wall part 82 of the stock 380 with the push-in die 70.

A method of forming the undercut part 386 in the stock 380 will be described with reference to FIGS. 11A to 11D. First, as shown in FIG. 11A, the stock 380 is set within the lower forming die 360 in which the curved part 364 recessed in a direction orthogonal to the central axis is formed. In addition, in the stock 380, in order to press-form a spherical overhang shape, the bottom wall part 384 of the stock 380 is preformed in a hemispherical shape. Then, if the upper forming die 310 is lowered, the punch part 327 abuts against the bottom wall part 384 of the stock 380.

Figure 11B:
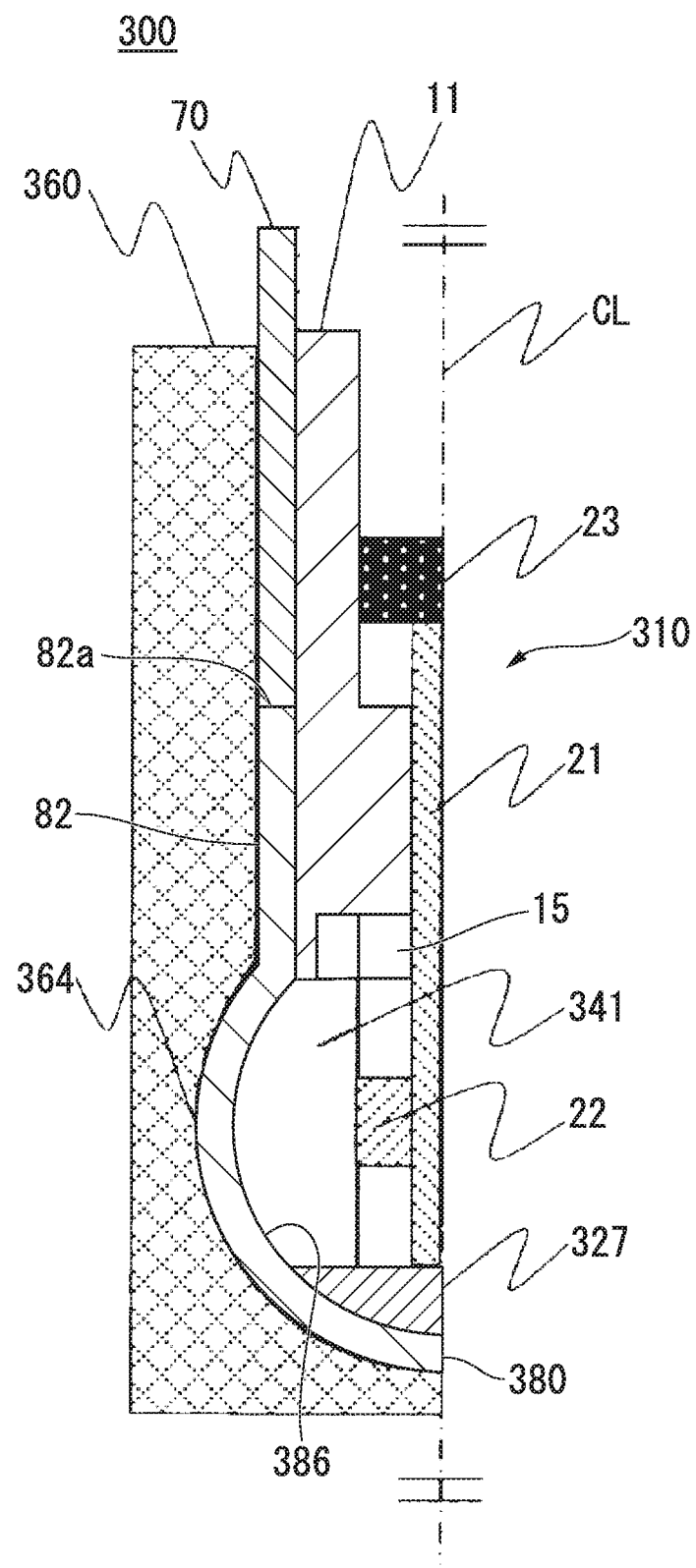
FIG. 11B is a longitudinal sectional view showing the continuation of a forming method using the forming die.

FIG. 11B is a view showing a state where the center core 11 is lowered to the bottom dead center from the state shown in FIG. 11A. As shown in FIG. 11B, if the center core 11 reaches the bottom dead center, the first split cores 331 and the second split cores 341 are brought into the diameter-increased state. By bringing the first split cores 331 and the second split cores 341 into the diameter-increased state, a portion of the vertical wall part 82 of the stock 380 is pushed into the curved part 364 of the lower forming die 360 and curved.

Moreover, by lowering the push-in die 70 to push in the upper end surface 82a of the vertical wall part 82 of the stock 380 in conjunction with the lowering of the center core 11 and the diameter-increasing operation of the first split cores 331 and the second split cores 341, the undercut part 386 is formed while making the material of the vertical wall part 82 of the stock 380 flow to the curved part of the stock 380. Then, by controlling the amount of push-in of the upper end surface 82a of the vertical wall part 82 of the stock 380, a reduction in the plate thickness of the undercut part 386 can be suppressed.

Figure 11C:
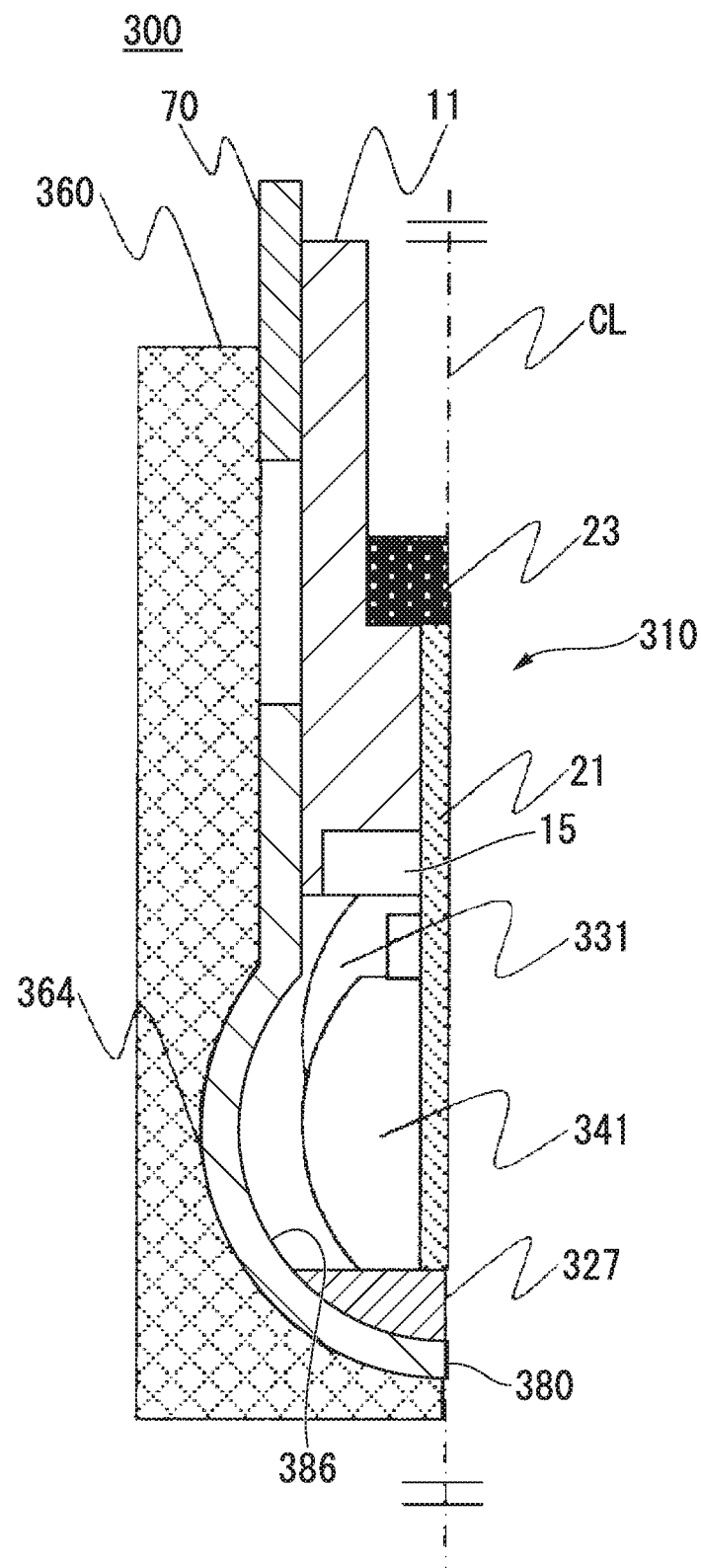
FIG. 11C is a longitudinal sectional view showing the continuation of the forming method using the forming die.
Figure 11D:
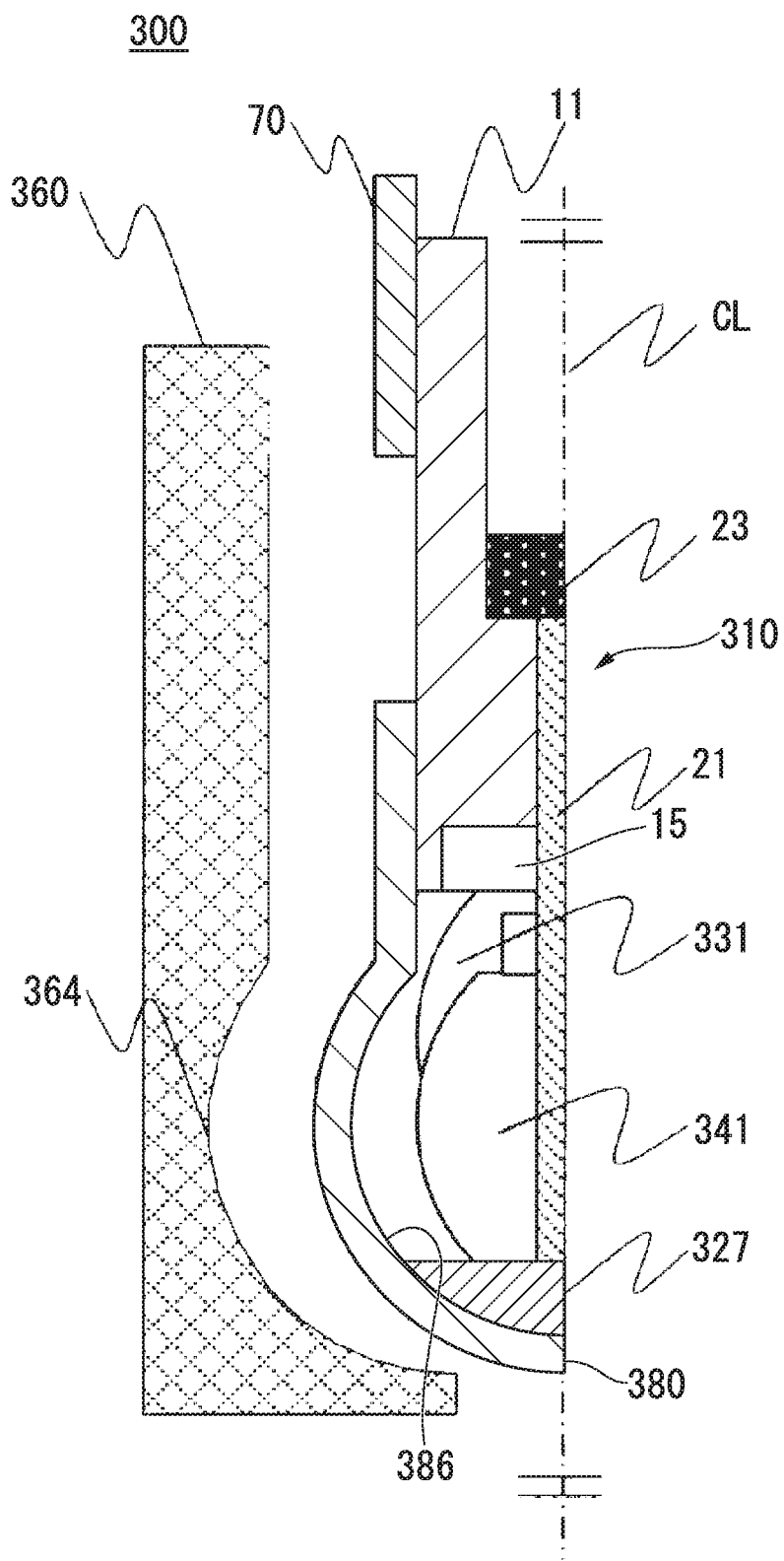
FIG. 11D is a longitudinal sectional view showing the continuation of the forming method using the forming die.

Subsequently, as shown in FIG. 11C, the push-in die 70 is raised along the central axis, and the center core 11 is raised. In this case, since the diameter of the first split cores 331 and the second split cores 341 is reduced with the ascent of the center core 11, the upper forming die 310 can be pulled out from the stock 380 after the forming. Additionally, as shown in FIG. 11D, the lower forming die 360 is split into two by a plane passing along the central axis. Thus, the stock 380 can be taken out by moving the lower forming die 360 toward the radial outer side using a radial moving mechanism (not shown). According to the present embodiment, a formed product having a spherical overhang shape at the bottom of the cup and having a uniform thickness can be obtained.

Figure 12:
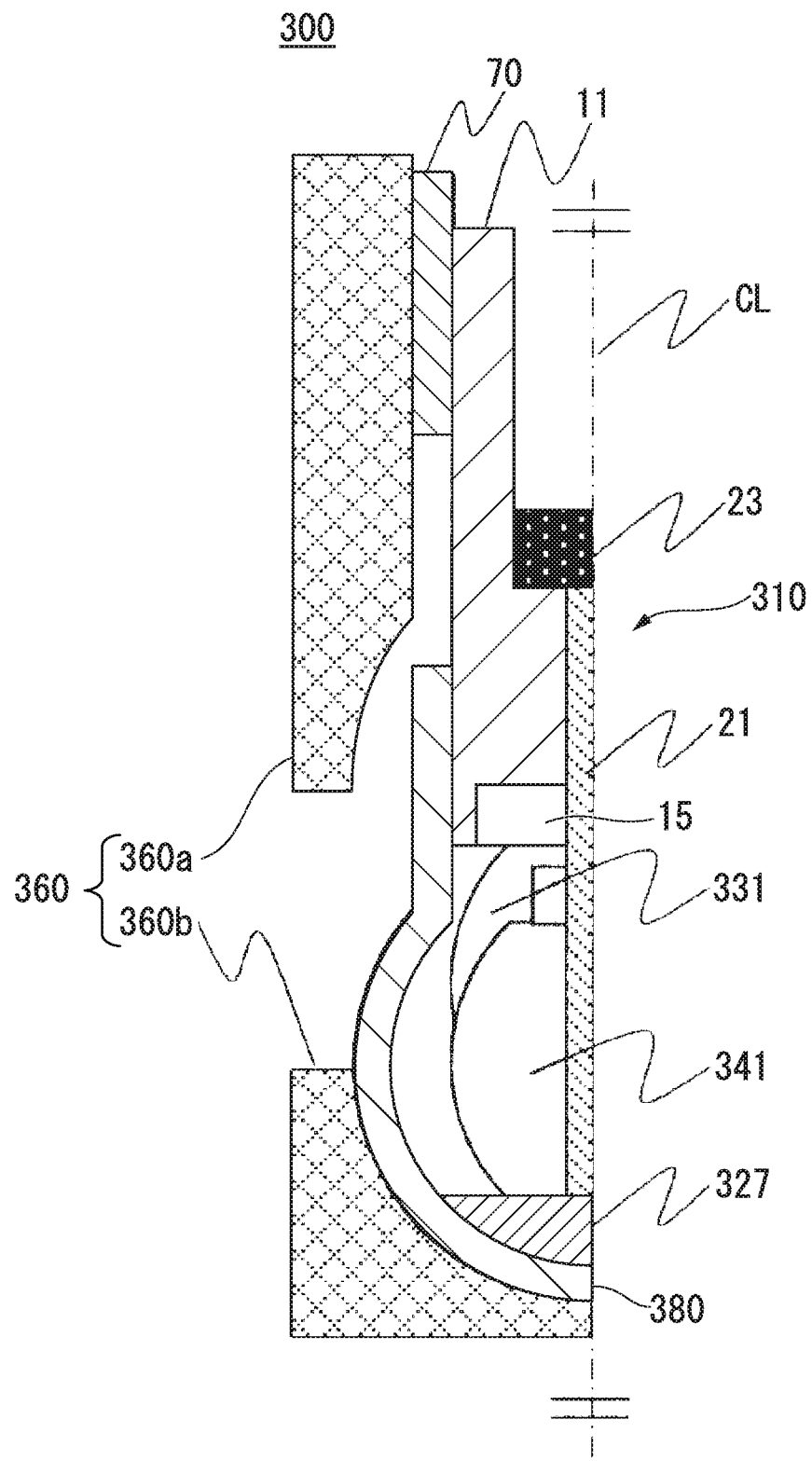
FIG. 12 is a longitudinal sectional view showing a modification example of the forming die related to the above third embodiment.

In the present embodiment, a case where the lower forming die 360 has a split structure in order to take out the stock 380 after the forming is shown. However, as shown in FIG. 12, the lower forming die 360 may be split by a plane that is perpendicular to the central axis and passes through the curved part 364. That is, the lower forming die 360 may be constituted of a first split lower forming die 360a and a second split lower forming die 360b. In this case, at the time of the take-out of the stock 380 after the forming, the moving mechanism that moves the lower forming die 360 in the radial direction is unnecessary, and the stock 380 after the forming can be taken out simply by moving the center core 11, the push-in die 70, and the first split lower forming die 360a along the central axis.

Fourth Embodiment

Next, a forming die 400 related to a fourth embodiment of the invention will be described. In addition, the same constituent elements as the above-described constituent element will be designated by the same reference signs, and thereby, the duplicate description thereof will be omitted below.

Figure 13:
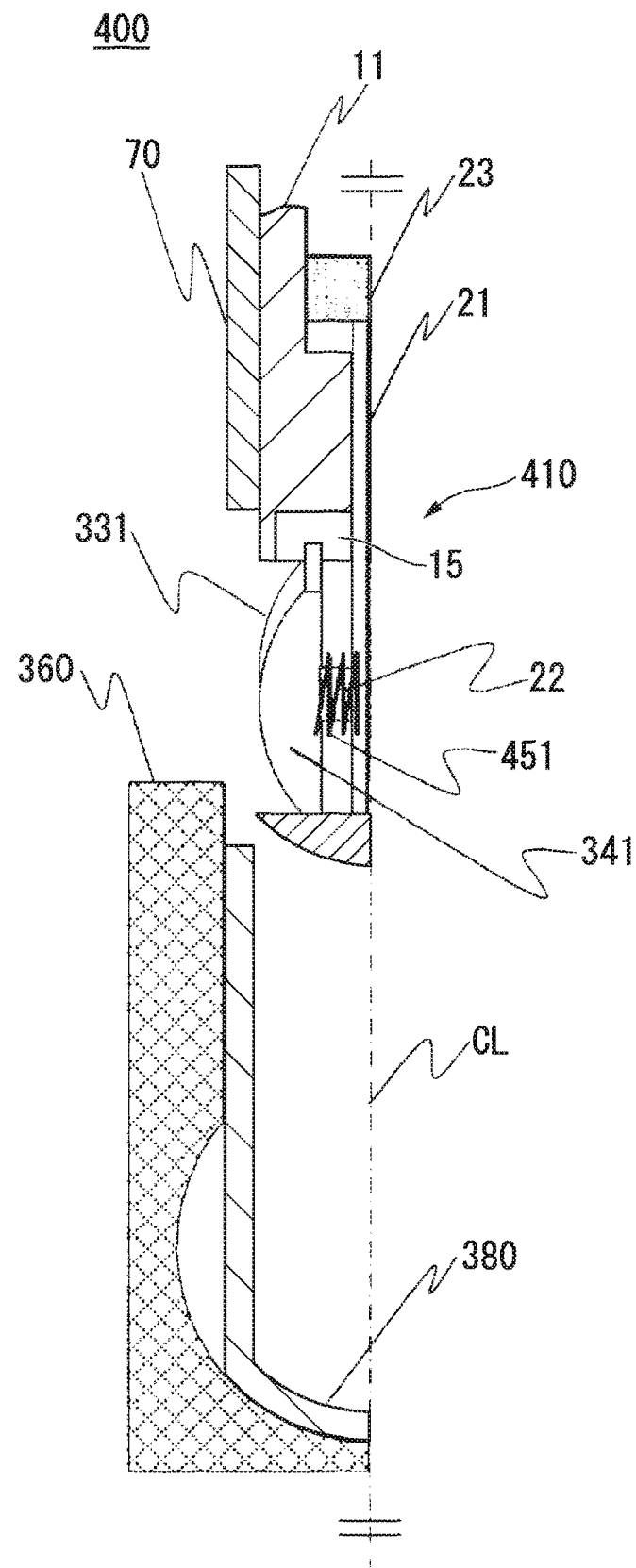
FIG. 13 is a view showing a forming die related to a fourth embodiment of the invention, and is a longitudinal sectional view showing a half on the left of an axis of the forming die in a section including the axis.

FIG. 13 is a longitudinal sectional view showing the forming die 400 related to the present embodiment. As shown in FIG. 13, the forming die 400 different from the forming die 300 related to the third embodiment in that an upper forming die 410 has a split core driving mechanism 451.

In the third embodiment, the diameter of the first split cores 331 and the second split cores 341 are reduced by the contact of the stock 380 with the undercut part 386 (the same applies to the first and second embodiments). However, in the present embodiment, the diameter-reducing operation of the first split cores 331 and the second split cores 341 is performed by using the split core driving mechanism 451.

Figure 14:
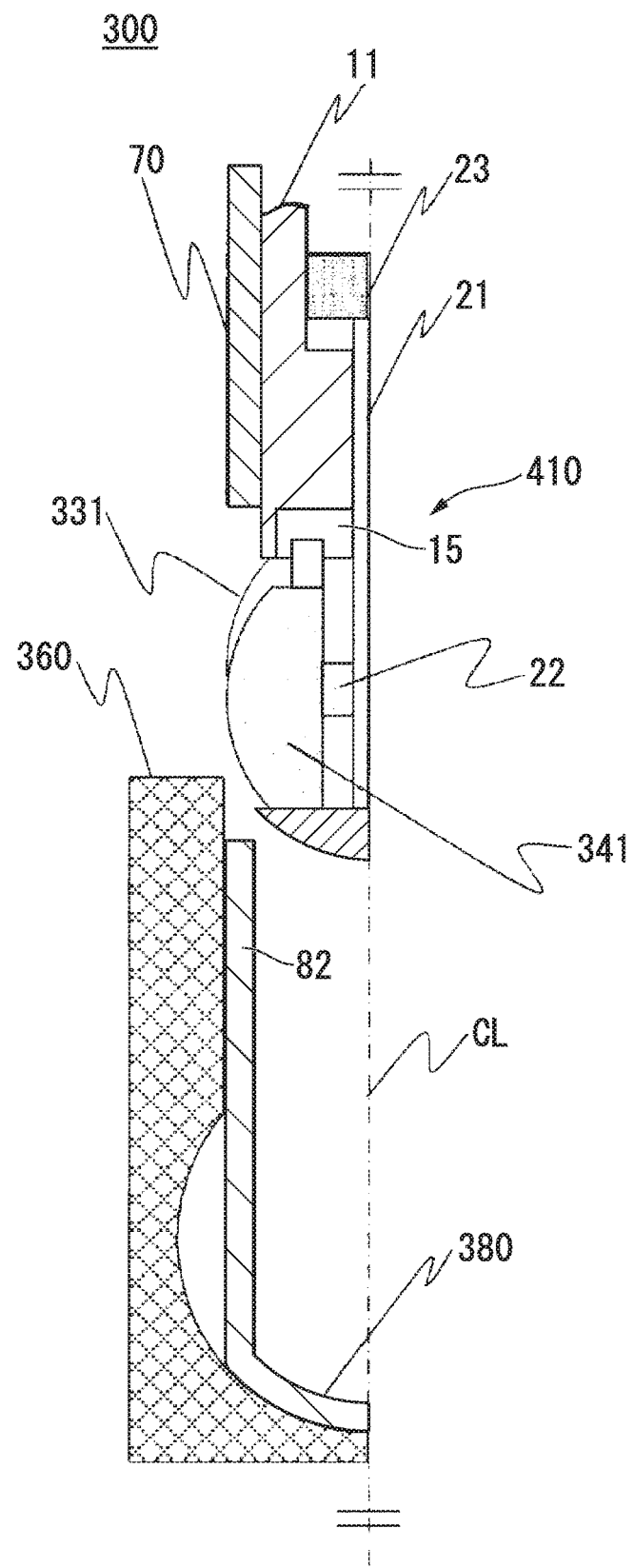
FIG. 14 is a longitudinal sectional view showing a state where each first split core and each second split core have moved toward a radial outer side before forming, in the forming die related to the above third embodiment.

At the time of application to mass production, it is necessary to increase the operating speed of the center core 11. For example, in the forming die 300 related to the third embodiment, as shown in FIG. 14, the diameter-increased state may be brought out due to a counteraction against the lowering of the center core 11 before the first split cores 331 and the second split cores 341 are inserted into the stock 380. In this case, the first split cores 331 and the second split cores 341 come into contact with the upper end surface 82a of the vertical wall part 82 of the stock 380, which causes an abnormal stop of a press apparatus. Additionally, in products in which the surface precision of the undercut part 386 of the stock 380 has an influence on performance, the contact between the first split cores 331 and the second split cores 341 at the time of diameter reduction is not preferable.

Thus, the diameter-reduced state can be maintained in an unloaded state by using the split core driving mechanism 451 shown in FIG. 13. As the split core driving mechanism 451, for example, a coil spring, a solenoid, or the like can be used. Additionally, in forming large-sized components, a hydraulic mechanism may be used.

Although the respective embodiments of the invention have been described above, these embodiments are presented as examples, and the scope of the invention are not limited only to these embodiments. These embodiments can be carried out in other various forms, and various omissions, substitutions, and alternations can be performed without departing from the concept of the invention. These embodiments and their modifications are embraced in the scope of the invention and its equivalent as defined in the claims, similar to being embraced in the scope and concept of the invention.

For example, in the above first embodiment, the lower forming die 60 is fixed, and the stock 80 is formed in a predetermined shape by moving the center core 11 and the push-in die 70. However, the center core 11 and the push-in die 70 may be fixed, and the lower forming die 60 may be raised. Additionally, the stock 80 may be formed in a predetermined shape by independently driving all of the center core 11, the push-in die 70, and the lower forming die 60.

Additionally, for example, in the above respective embodiments, the method of forming the undercut part in the cup-like stock is shown. However, an undercut part may be formed in an inner surface of a hollow pipe, using the forming die related to the invention.

INDUSTRIAL APPLICABILITY

According to the invention, the forming die and the undercut forming method that can form a formed product having an undercut part at low cost can be provided.

BRIEF DESCRIPTION OF THE REFERENCE SYMBOLS

1: FORMING DIE (FIRST EMBODIMENT)
10: UPPER FORMING DIE
11: CENTER CORE (DIE BODY)
11*a*: CENTER CORE OUTER PERIPHERAL SURFACE
11*b*: BOTTOM SURFACE
12: BOSS PART
13: ATTACHMENT HOLE (INSERTION HOLE)
14: STEPPED PART
15: GROOVE PART (SLIDING GROOVE)
16: ABUTTING SURFACE
17: ATTACHMENT HOLE (INSERTION HOLE)
18: CUTOUT PART (RECESSED PART)
19: GUIDE PIN (FIRST GUIDE PART)
21: GUIDE CORE (MOVABLE SHAFT MEMBER)
22: GUIDE PIN (SECOND GUIDE PART)
23: STOPPER
31: FIRST SPLIT CORE
32: FORMING PART
32*a*: INCLINED SURFACE (FORMING SURFACE) OF FORMING PART
32*b*: VERTICAL PLANE OF FORMING PART
33: PROTRUSION OF FIRST SPLIT CORE
34: CUTOUT PART OF FIRST SPLIT CORE
35: UPPER SURFACE OF FIRST SPLIT CORE
36: BOTTOM SURFACE OF FIRST SPLIT CORE
37: INCLINED SURFACE (FIRST INCLINED SURFACE) OF FIRST SPLIT CORE
38: ATTACHMENT HOLE (FIRST HOUSING PART)
41: SECOND SPLIT CORE
42: FORMING PART OF SECOND SPLIT CORE
42*a*: INCLINED SURFACE (FORMING SURFACE) OF FORMING PART
42*b*: VERTICAL PLANE OF FORMING PART
43: PROTRUSION OF SECOND SPLIT CORE
44: CUTOUT PART OF SECOND SPLIT CORE
45: UPPER SURFACE OF SECOND SPLIT CORE
46: BOTTOM SURFACE OF SECOND SPLIT CORE
47: INCLINED SURFACE OF SECOND SPLIT CORE (MATING SURFACE WITH FIRST SPLIT CORE 31: SECOND INCLINED SURFACE)
48: ATTACHMENT HOLE (SECOND HOUSING PART)
60: LOWER FORMING DIE
61: BOTTOM PART
62: SIDE WALL PART
70: PUSH-IN DIE
80: STOCK
82: VERTICAL WALL PART
82*a*: UPPER END SURFACE OF VERTICAL WALL PART
84: BOTTOM WALL PART
86: UNDERCUT PART
CL: CENTRAL AXIS (MOVEMENT AXIS)

The invention claimed is:

1. A forming die comprising:
a lower forming die having a bottom part and a side wall part;
an upper forming die that is movable toward the bottom part of the lower forming die along an axis parallel to the side wall part of the lower forming die; and
a push-in die that is movable toward the bottom part of the lower forming die along the axis between the side wall part of the lower forming die and the upper forming die,
wherein the upper forming die includes:
a die body that is provided to be movable toward the bottom part of the lower forming die along the axis, in a state where a central axis coincides with the axis;
a first split core that abuts against a bottom surface of the die body and is provided to be movable in a direction that extends radially with the axis as a center;
a movable shaft member that is provided to be non-detachable downward from the bottom surface of the die body and be insertable into an inside of the die body from the bottom surface of the die body along the axis, in a state where a central axis coincides with the axis; and
a second split core that is provided to be movable in a direction that extends radially from a lower end of the movable shaft member with the axis as a center,
wherein the first and second split cores alternately disposed around the axis,
wherein the first and second split cores respectively have forming surfaces that separate from the die body, as the first and second split cores move apart from the axis in the extending direction,
wherein the first and second split cores are present inside an outer edge of the die body, and the second split core is disposed below the first split core, in a state where the movable shaft member is exposed most from the die body, and
wherein the second split core approaches the bottom surface of the die body while sliding on the first split core, in a process in which the movable shaft member is inserted into the inside of the die body, and thereby, the first and second split cores respectively move to positions where the forming surfaces of the first and second split cores protrude outside of the outer edge of the die body.

2. The forming die according to claim 1,
wherein the first split core further includes a pair of first inclined surfaces that are joined together so as to narrow with an upper surface of the first split core as a center while sandwiching the upper surface of the first split core therebetween, wherein the second split core further includes a second inclined surface that is a surface mating with the first split core and comes into contact with the first inclined surfaces of the first split core, wherein portions of the first inclined surfaces of the first split core overlap the second inclined surface of the second split core, in a state where the movable shaft member is exposed most from the die body, and wherein, in a process in which the movable shaft member is inserted into the inside of the die body, the first split core and the second split core move while the first inclined surfaces of the first split core and the second inclined surface of the second split core slide on each other until the first inclined surfaces of the first split core and the second inclined surface of the second split core are mated with each other.

3. The forming die according to claim 2, wherein the die body includes a first guide part that has a columnar shape and extends toward a radial outer side, wherein the movable shaft member includes a second guide part that has a columnar shape and extends toward the radial outer side, wherein the first split core further includes a first housing part that slides along the extending direction of the first guide part with respect to the first guide part and houses the first guide part, and wherein the second split core further includes a second housing part that slides along the extending direction of the second guide part with respect to the second guide part and houses the second guide part.

4. The forming die according to claim 3, wherein the hardness of the first guide part is lower than the hardness of the first split core, and wherein the hardness of the second guide part is lower than the hardness of the second split core.

5. A method of forming an undercut part in a stock having an opening, using the forming die according to claim 4, the method comprising:

a first process in which the stock is placed on the lower forming die along the bottom part and the side wall part;

a second process in which the second split core is made to approach the bottom surface of the die body while being made to slide on the first split core at a predetermined position within the opening of the stock, and the forming surfaces of the first and second split cores are made to protrude outside of the outer edge of the die body;

a third process in which the push-in die is moved toward the bottom part of the lower forming die while being made to abut against the stock, and a portion of an inside surface of the stock and is made to abut against the forming surfaces of the first and second split cores; and a fourth process in which the upper forming die is moved in a direction away from the bottom part of the lower forming die.

6. The forming die according to claim 3, wherein the first split core further includes a protrusion that is provided on an upper surface of the first split core, wherein the second split core further includes a protrusion that is provided on an upper surface of the second split core, and wherein the die body further includes an abutting surface that abuts against the protrusion of the first split core and the protrusion of the second split core.

7. A method of forming an undercut part in a stock having an opening, using the forming die according to claim 6, the method comprising:

a first process in which the stock is placed on the lower forming die along the bottom part and the side wall part;

a second process in which the second split core is made to approach the bottom surface of the die body while being made to slide on the first split core at a predetermined position within the opening of the stock, and the forming surfaces of the first and second split cores are made to protrude outside of the outer edge of the die body;

a third process in which the push-in die is moved toward the bottom part of the lower forming die while being made to abut against the stock, and a portion of an inside surface of the stock and is made to abut against the forming surfaces of the first and second split cores; and a fourth process in which the upper forming die is moved in a direction away from the bottom part of the lower forming die.

8. The forming die according to claim 2, wherein the first split core further includes a protrusion that is provided on an upper surface of the first split core, wherein the second split core further includes a protrusion that is provided on an upper surface of the second split core, and wherein the die body further includes an abutting surface that abuts against the protrusion of the first split core and the protrusion of the second split core.

9. A method of forming an undercut part in a stock having an opening, using the forming die according to claim 2, the method comprising:

a first process in which the stock is placed on the lower forming die along the bottom part and the side wall part;

a second process in which the second split core is made to approach the bottom surface of the die body while being made to slide on the first split core at a predetermined position within the opening of the stock, and the forming surfaces of the first and second split cores are made to protrude outside of the outer edge of the die body;

a third process in which the push-in die is moved toward the bottom part of the lower forming die while being made to abut against the stock, and a portion of an inside surface of the stock and is made to abut against the forming surfaces of the first and second split cores; and a fourth process in which the upper forming die is moved in a direction away from the bottom part of the lower forming die.

10. The forming die according to claim 1, wherein the die body includes a first guide part that has a columnar shape and extends toward a radial outer side, wherein the movable shaft member includes a second guide part that has a columnar shape and extends toward the radial outer side, wherein the first split core further includes a first housing part that slides along the extending direction of the first guide part with respect to the first guide part and houses the first guide part, and wherein the second split core further includes a second housing part that slides along the extending direction of the second guide part with respect to the second guide part and houses the second guide part.

11. The forming die according to claim 10,
wherein the hardness of the first guide part is lower than the hardness of the first split core, and
wherein the hardness of the second guide part is lower than the hardness of the second split core.

12. The forming die according to claim 11,
wherein the first split core further includes a protrusion that is provided on an upper surface of the first split core,
wherein the second split core further includes a protrusion that is provided on an upper surface of the second split core, and
wherein the die body further includes an abutting surface that abuts against the protrusion of the first split core and the protrusion of the second split core.

13. A method of forming an undercut part in a stock having an opening, using the forming die according to claim 11, the method comprising:
a first process in which the stock is placed on the lower forming die along the bottom part and the side wall part;
a second process in which the second split core is made to approach the bottom surface of the die body while being made to slide on the first split core at a predetermined position within the opening of the stock, and the forming surfaces of the first and second split cores are made to protrude outside of the outer edge of the die body;
a third process in which the push-in die is moved toward the bottom part of the lower forming die while being made to abut against the stock, and a portion of an inside surface of the stock and is made to abut against the forming surfaces of the first and second split cores; and
a fourth process in which the upper forming die is moved in a direction away from the bottom part of the lower forming die.

14. The forming die according to claim 10,
wherein the first split core further includes a protrusion that is provided on an upper surface of the first split core,
wherein the second split core further includes a protrusion that is provided on an upper surface of the second split core, and
wherein the die body further includes an abutting surface that abuts against the protrusion of the first split core and the protrusion of the second split core.

15. A method of forming an undercut part in a stock having an opening, using the forming die according to claim 10, the method comprising:
a first process in which the stock is placed on the lower forming die along the bottom part and the side wall part;
a second process in which the second split core is made to approach the bottom surface of the die body while being made to slide on the first split core at a predetermined position within the opening of the stock, and the forming surfaces of the first and second split cores are made to protrude outside of the outer edge of the die body;
a third process in which the push-in die is moved toward the bottom part of the lower forming die while being made to abut against the stock, and a portion of an inside surface of the stock and is made to abut against the forming surfaces of the first and second split cores; and
a fourth process in which the upper forming die is moved in a direction away from the bottom part of the lower forming die.

16. The forming die according to claim 1,
wherein the first split core further includes a protrusion that is provided on an upper surface of the first split core,
wherein the second split core further includes a protrusion that is provided on an upper surface of the second split core, and
wherein the die body further includes an abutting surface that abuts against the protrusion of the first split core and the protrusion of the second split core.

17. A method of forming an undercut part in a stock having an opening, using the forming die according to claim 16, the method comprising:
a first process in which the stock is placed on the lower forming die along the bottom part and the side wall part;
a second process in which the second split core is made to approach the bottom surface of the die body while being made to slide on the first split core at a predetermined position within the opening of the stock, and the forming surfaces of the first and second split cores are made to protrude outside of the outer edge of the die body;
a third process in which the push-in die is moved toward the bottom part of the lower forming die while being made to abut against the stock, and a portion of an inside surface of the stock and is made to abut against the forming surfaces of the first and second split cores; and
a fourth process in which the upper forming die is moved in a direction away from the bottom part of the lower forming die.

18. A method of forming an undercut part in a stock having an opening, using the forming die according to claim 1, the method comprising:
a first process in which the stock is placed on the lower forming die along the bottom part and the side wall part;
a second process in which the second split core is made to approach the bottom surface of the die body while being made to slide on the first split core at a predetermined position within the opening of the stock, and the forming surfaces of the first and second split cores are made to protrude outside of the outer edge of the die body;
a third process in which the push-in die is moved toward the bottom part of the lower forming die while being made to abut against the stock, and a portion of an inside surface of the stock and is made to abut against the forming surfaces of the first and second split cores; and
a fourth process in which the upper forming die is moved in a direction away from the bottom part of the lower forming die.

19. The undercut forming method according to claim 18,
wherein in the first process, an outside surface of the stock is made to abut against the side wall part of the lower forming die, and wherein in the third process, the push-in die is moved toward the bottom part of the lower forming die while being made to abut against an upper end surface of the stock.

* * * * *